US012744646B2

(12) United States Patent
Hirzallah et al.

(10) Patent No.: US 12,744,646 B2
(45) Date of Patent: Sep. 22, 2026

(54) SIGNALING AND CONFIGURATION FOR MULTI ANTENNA/PORT PRS TRANSMISSION AND RECEPTION

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 18/449,357

(22) Filed: Aug. 14, 2023

(65) Prior Publication Data

US 2025/0062875 A1 Feb. 20, 2025

(51) Int. Cl.
*H04W 8/24* (2009.01)
*H04L 5/00* (2006.01)

(52) U.S. Cl.
CPC .................................. *H04L 5/0053* (2013.01)

(58) Field of Classification Search
CPC ........ H04L 5/0053; H04L 5/00; H04W 64/00; H04W 8/24
See application file for complete search history.

(56) References Cited

U.S. PATENT DOCUMENTS

2023/0199701 A1 6/2023 Cheema et al.
2023/0199710 A1* 6/2023 Verdon .................. G06T 11/00 340/815.4
2024/0056249 A1* 2/2024 Oteri .................... H04L 5/0048
2024/0057012 A1* 2/2024 Oteri .................... G01S 5/0236
(Continued)

FOREIGN PATENT DOCUMENTS

WO 2021154406 A1 8/2021
WO 2021229026 A1 11/2021
WO 2022205487 A1 10/2022

OTHER PUBLICATIONS

3GPP TSG-RAN WG1 Meeting#110, R1-2208021 Title:CR on PRS reception and SRS transmission outside initial BWP (Year: 2022).*
(Continued)

*Primary Examiner* — Faruk Hamza
*Assistant Examiner* — Abusayeed M Haque
(74) *Attorney, Agent, or Firm* — Thien T. Nguyen

(57) ABSTRACT

A method for positioning includes: transmitting, from a user equipment (UE), a UE capability message indicating a capability of the UE to process one or more positioning reference signals (PRS) transmitted from one or more transmission antennas and received at one or more reception antennas of the UE; receiving, at the UE, assistance data including information for processing the one or more PRS transmitted from the one or more transmission antennas based on the UE capability message; receiving, at the one or more reception antennas of the UE, the one or more PRS from the one or more transmission antennas; and obtaining one or more measurements based on the one or more PRS and associating each of the one or more measurements with one of the one or more transmission antennas as a PRS source antenna and one of the one or more reception antennas as a PRS reception.

32 Claims, 18 Drawing Sheets

(56) References Cited

U.S. PATENT DOCUMENTS

2024/0297748 A1 * 9/2024 Lee ........................ H04L 5/0007

OTHER PUBLICATIONS

3GPP TSG RAN WG1 Meeting#86bis, R1-1608619 Title:Configuration of downlink positioning reference signal for NB-IoT (Year: 2016).*

International Search Report and Written Opinion—PCT/US2024/035497—ISA/EPO—Dec. 4, 2024.

* cited by examiner

| PRS MEASUREMENTS | PRS RESOURCE ID | TX ANTENNA | RX ANTENNA |
|---|---|---|---|
| PRS measurements 1 | dl-PRS-ID_TX1 | TX1 | RX1 |
| PRS measurements 2 | dl-PRS-ID_TX1 | TX1 | RX2 |
| PRS measurements 3 | dl-PRS-ID_TX2 | TX2 | RX1 |
| PRS measurements 4 | dl-PRS-ID_TX2 | TX2 | RX2 |
| PRS measurements 5 | dl-PRS-ID_TX3 | TX3 | RX1 |
| PRS measurements 6 | dl-PRS-ID_TX3 | TX3 | RX2 |
| PRS measurements 7 | dl-PRS-ID_TX4 | TX4 | RX1 |
| PRS measurements 8 | dl-PRS-ID_TX4 | TX4 | RX2 |

903 904 905 906

| PRS MEASUREMENTS | PRS RESOURCE ID | TX ANTENNA | RX ANTENNA |
|---|---|---|---|
| PRS measurements 1 | dl-PRS-ID_TX1 | TX1 | RX1 |
| PRS measurements 2 | dl-PRS-ID_TX2 | TX2 | RX1 |
| PRS measurements 3 | dl-PRS-ID_TX3 | TX3 | RX1 |
| PRS measurements 4 | dl-PRS-ID_TX4 | TX4 | RX1 |

FIG. 9B

| PRS MEASUREMENTS | PRS RESOURCE ID | TX ANTENNA | RX ANTENNA |
| --- | --- | --- | --- |
| PRS measurements 1 | dl-PRS-ID_TX1 | TX1 | RX1 |
| PRS measurements 2 | dl-PRS-ID_TX1 | TX2 | RX2 |

SIGNALING AND CONFIGURATION FOR MULTI ANTENNA/PORT PRS TRANSMISSION AND RECEPTION

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax®), a fifth-generation (5G) service (e.g., 5G New Radio (NR)), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment (UE), includes: one or more memories; one or more reception antennas; one or more transceivers; and one or more processors, communicatively coupled to the one or more memories and the one or more transceivers, configured to: transmit, via the one or more transceivers, a UE capability message indicating a capability of the UE to process one or more positioning reference signals (PRS) transmitted from one or more transmission antennas and received at the one or more reception antennas; receive, via the one or more transceivers, assistance data including information for processing the one or more PRS transmitted using the one or more transmission antennas based on the UE capability message; receive, via the one or more reception antennas, the one or more PRS from the one or more transmission antennas; and obtain one or more measurements based on the one or more PRS and associate each of the one or more measurements with one of the one or more transmission antennas as a PRS source antenna and one of the one or more reception antennas as a PRS reception antenna.

In another embodiment, a signal transfer method includes: transmitting, from a user equipment (UE), a UE capability message indicating a capability of the UE to process one or more positioning reference signals (PRS) transmitted from one or more transmission antennas and received at one or more reception antennas of the UE; receiving, at the UE, assistance data including information for processing the one or more PRS transmitted using the one or more transmission antennas based on the UE capability message; receiving, at the one or more reception antennas of the UE, the one or more PRS from the one or more transmission antennas; and obtaining one or more measurements based on the one or more PRS and associating each of the one or more measurements with one of the one or more transmission antennas as a PRS source antenna and one of the one or more reception antennas as a PRS reception antenna.

In another embodiment, a transmission/reception point (TRP), includes: one or more memories; one or more transmission antennas; one or more transceivers; and one or more processors, communicatively coupled to the one or more memories and the one or more transceivers, configured to: transmit, via the one or more transceivers, a TRP capability message indicating a capability of the TRP to transmit one or more positioning reference signals (PRS) from the one or more transmission antennas; receive, via the one or more transceivers, a PRS resource configuration message comprising information for transmitting PRS using the one or more transmission antennas based on the TRP capability message; transmit, using the one or more transmission antennas, the one or more PRS based on the PRS resource configuration message, wherein one or more identifiers for the one or more PRS incorporates identifiers of the one or more transmission antennas as one or more sources of the one or more PRS.

In another embodiment, a signal transfer method, includes: transmitting, from a transmission/reception point (TRP), a TRP capability message indicating a capability of the TRP to transmit one or more positioning reference signals (PRS) from one or more transmission antennas of the TRP; receiving, at the TRP, a PRS resource configuration message comprising information for transmitting PRS using the one or more transmission antennas based on the TRP capability message; and transmitting, using the one or more transmission antennas of the TRP, the one or more PRS based on the PRS resource configuration message, wherein an identifier for the one or more PRS incorporates identifiers of the one or more transmission antennas as one or more sources of the one or more PRS.

In another embodiment, a network entity, includes: one or more memories; one or more transceivers; and one or more processors, communicatively coupled to the one or more memories and the one or more transceivers, configured to: receive, from a user equipment (UE), a UE capability message indicating a capability of the UE to process one or more positioning reference signals (PRS) transmitted from one or more transmission antennas and received at one or more reception antennas of the UE; receive, from a transmission/reception point (TRP), a TRP capability message indicating a capability of the TRP to transmit the one or more PRS from the one or more transmission antennas; determine a PRS resource configuration based on the UE capability message and the TRP capability message; send, via the one or more transceivers to the TRP, a PRS resource configuration message comprising information for transmitting PRS using the one or more transmission antennas based on the TRP capability message; and send, via the one or more transceivers to the UE, assistance data comprising information for processing the PRS transmitted using the one or more transmission antennas based on the UE capability message.

In another embodiment, a signal transfer method, includes: receiving, from a user equipment (UE), a UE capability message indicating a capability of the UE to process one or more positioning reference signals (PRS) transmitted from one or more transmission antennas and received at one or more reception antennas of the UE; receiving, from a transmission/reception point (TRP), a TRP capability message indicating a capability of the TRP to transmit the one or more PRS from the one or more transmission antennas; determining a PRS resource configuration based on the UE capability message and the TRP capability message; sending, to the TRP, a PRS resource configuration message comprising information for transmitting PRS using the one or more transmission antennas based on the TRP capability message; and sending, to the UE, assistance data comprising information for processing the PRS transmitted using the one or more transmission antennas based on the UE capability message.

BRIEF DESCRIPTION OF THE DRAWINGS

FIGS. 9A-9B illustrate an example multiple input/single output (MISO) multiple antenna PRS.

DETAILED DESCRIPTION

Figure 1:
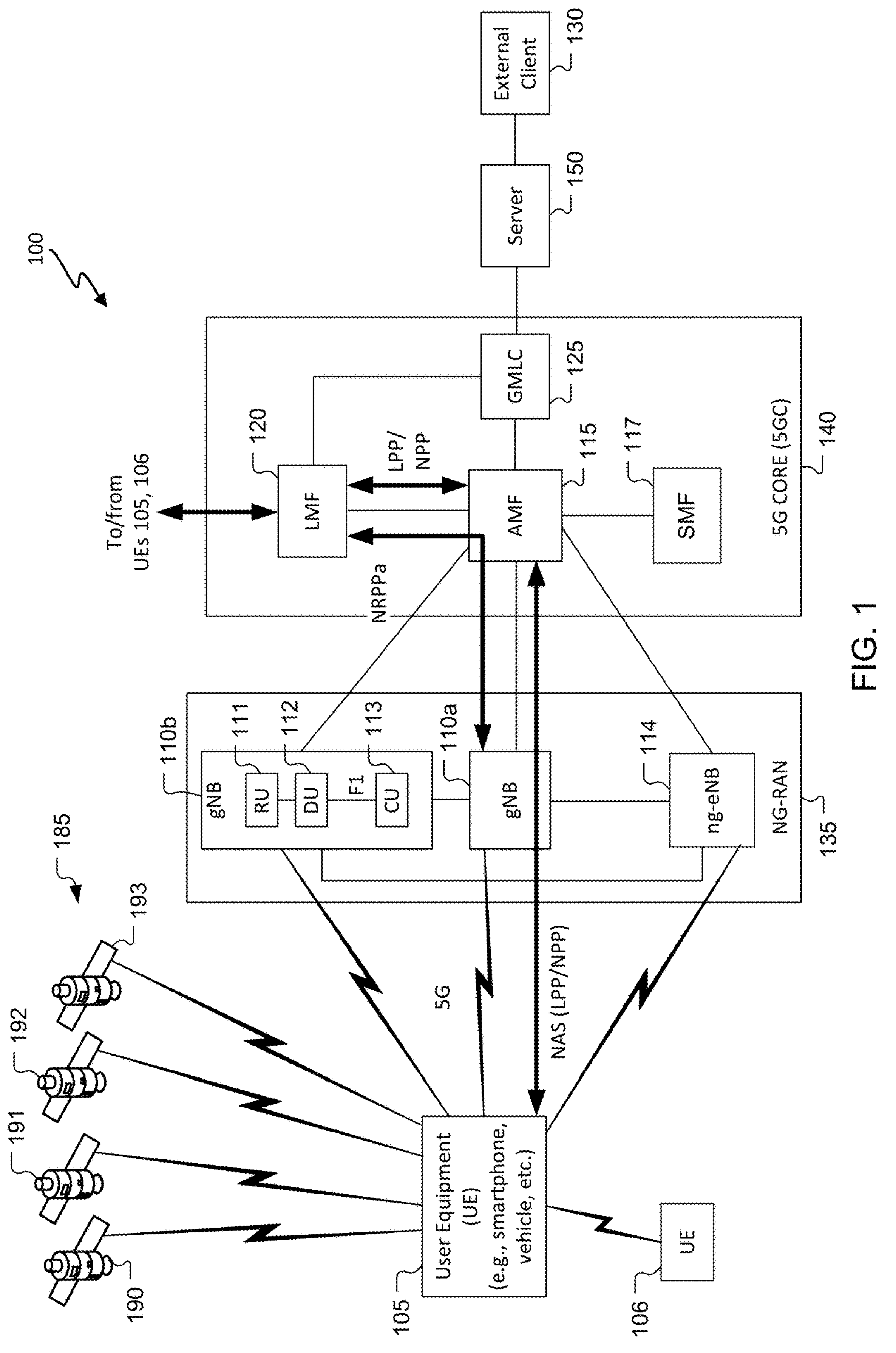
FIG. 1 is a simplified diagram of an example wireless communications system.

In challenging environments, such as indoor environments, positioning performance may be reduced due to non-line of sight between a user equipment (UE) and the transmission/reception point (TRP). Non-line of sight may lead to radio signals being blocked or reflected by obstacles, such as buildings. Blocked or reflected (multipath) signal propagation may result in incomplete and/or distorted PRS signal information. Data-driven methods, such as Artificial Intelligence/Machine Learning (AI/ML) models, may be implemented to transform measurements obtained from the signals to position estimates. Measurements from multiple transmission antennas on the TRP side, and/or multiple reception antennas on the UE side, where the UE may distinguish between the transmission antennas, may provide a richer data set for the AI/ML models, leading to more improved positioning performance and enhanced positioning experience, especially in non-line-of-sight conditions.

To implement enhancements to PRS transmission, multiple antennas for PRS transmission may be configured at the TRP side using Frequency Division Multiplexing (FDM), where TX antennas are configured with different Positioning Frequency Layers (PFLs). Multiple TX antennas may alternatively be configured with the same PFL but with different frequency offsets. To implement enhancements to PRS reception, multiple antennas for PRS reception may be configured at the UE side, with or without sequential antenna reception. UE and TRP capability signaling and assistance data may be utilized to configure the mapping of PRS measurements to sourcing TX antenna/receiving RX antenna pairs. Techniques are discussed herein for multiple antenna PRS transmission and reception. Other configurations, however, may be used. Items and/or techniques described herein may provide one or more of the following capabilities, as well as other capabilities not mentioned. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated one or more processors to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device." a "wireless device," a "subscriber device," a "subscriber terminal," a "subscriber station," a "user terminal" or UT, a "mobile terminal," a "mobile station," a "mobile device." or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110*a*. 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any, or all of which may be utilized as appropriate, and each of which may be duplicated or omitted, as necessary. Specifically, although one UE 105 is illustrated, many UEs (e.g., hundreds, thousands, millions, etc.) may be utilized in the communication system 100. Similarly, the communication system 100 may include a larger (or smaller)

number of SVs (i.e., more, or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurements received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality, respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-CNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1: M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*. 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (ELTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share one or more processors but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*. 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA)

for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurements (e.g., beam ID, beam width, mean angle, RSRP. RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurements back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
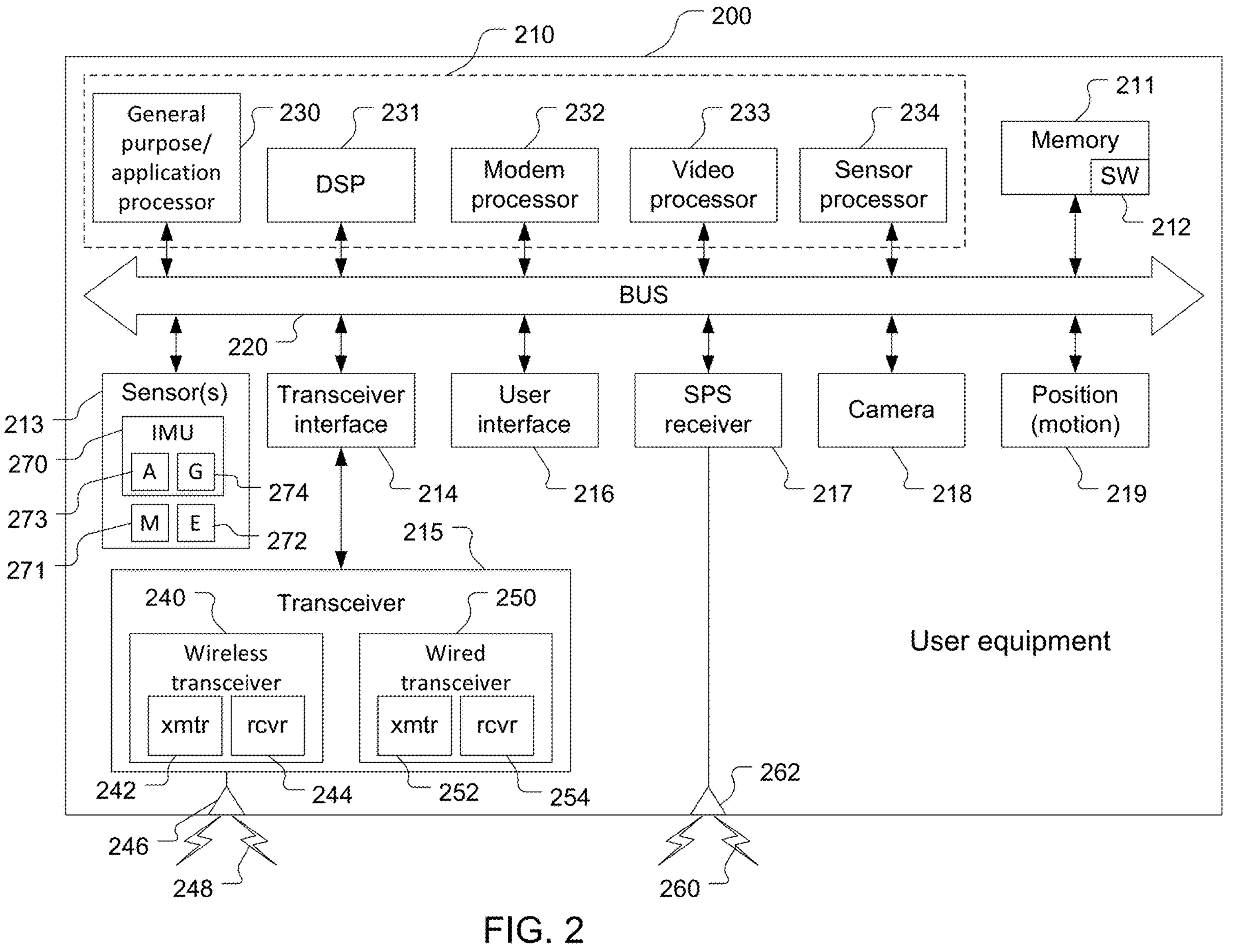
FIG. 2 is a block diagram of components of an example user equipment shown in FIG. 1.

Referring also to FIG. 2, a UE 200 may be an example of one of the UEs 105, 106 and may comprise a computing platform including one or more processors 210, one or more memories 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The one or more processors 210, the one or more memories 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The one or more processors 210 may include one or more intelligent hardware devices, e.g., a central processing unit (CPU), a microcontroller, an application specific integrated circuit (ASIC), etc. The one or more processors 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The one or more memories 211 may be a non-transitory storage medium that may include random access memory (RAM), flash memory, disc memory, and/or read-only memory (ROM), etc. The one or more memories 211 may store the software 212 which may be processor-readable, processor-executable software code containing instructions that may be configured to, when executed, cause the one or more processors 210 to perform various functions described herein. Alternatively, the software 212 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the one or more processors 210 performing a function as shorthand for one or more of the processors 230-234 performing the function. The description herein may refer to the UE 200 performing a function as shorthand for one or more appropriate components of the UE 200 performing the function. The one or more processors 210 may include one or more memories with stored instructions in addition to and/or instead of the one or more memories 211. Functionality of the one or more processors 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the one or more processors 210, the one or more memories 211, and the wireless transceiver 240. Other example configurations may include one or more of the processors 230-234 of the one or more processors 210, the one or more memories 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the one or more memories 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelero meter(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the one or more processors 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®), WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the one or more memories 211 to be processed by DSP 231 and/or the general-purpose/application processor 230 in response to action from a user. Similarly, applications hosted on the UE 200 may store indications of analog and/or digital signals in the one or more memories 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical, or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the one or more memories 211, the DSP 231 and/or one or more specialized processors (not shown) may be utilized to process acquired SPS signals, in whole or in part, and/or to calculate an estimated location of the UE 200, in conjunction with the SPS receiver 217. The one or more memories 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the one or more memories 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the one or more processors 210 and the one or more memories 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the one or more processors 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
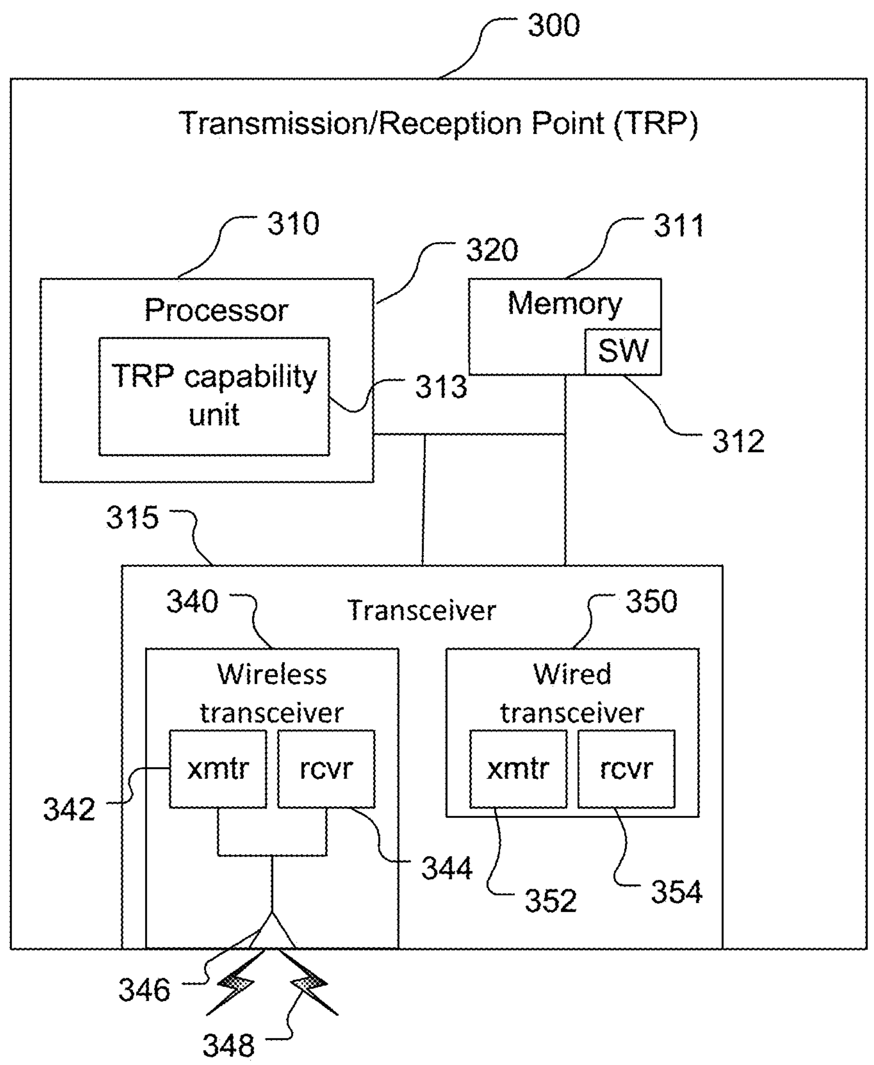
FIG. 3 is a block diagram of components of an example transmission/reception point.

Referring also to FIG. 3, an example of a TRP 300 of the gNBs 110*a*, 110*b* and/or the ng-eNB 114 comprises a computing platform including one or more processors 310, one or more memories 311 including software (SW) 312, and one or more transceivers 315. The one or more processors 310, the one or more memories 311, and the one or more transceivers 315 may be communicatively coupled to each other by a bus 320 (which may be configured, e.g., for optical and/or electrical communication). One or more of the shown apparatus (e.g., a wireless transceiver) may be omitted from the TRP 300. The one or more processors 310 may include one or more intelligent hardware devices, e.g., a central processing unit (CPU), a microcontroller, an application specific integrated circuit (ASIC), etc. The one or more processors 310 may comprise multiple processors (e.g., including a general-purpose/application processor, a DSP, a modem processor, a video processor, and/or a sensor processor as shown in FIG. 2). The one or more memories 311 may be a non-transitory storage medium that may include random access memory (RAM)), flash memory, disc memory, and/or read-only memory (ROM), etc. The one or more memories 311 may store the software 312 which may be processor-readable, processor-executable software code containing instructions that are configured to, when executed, cause the one or more processors 310 to perform various functions described herein. Alternatively, the software 312 may not be directly executable by the one or more processors 310 but may be configured to cause the one or more processors 310, e.g., when compiled and executed, to perform the functions. The one or more processors 310 (possibly in conjunction with the one or more memories 311 and, as appropriate, the one or more transceivers 315) may include a TRP capability unit 313. The TRP capability unit 313 may be configured to generate TRP capability messages that indicate one or more capabilities of the TRP 300. The TRP capability unit 313 is discussed further below with reference to FIG. 13, and the description may refer to the one or more processors 310 generally, or the TRP 300 generally, as performing any of the functions of the TRP capability unit 313, with the TRP 300 being configured to perform the function(s).

The description herein may refer to the one or more processors 310 performing a function, but this includes other implementations such as where the one or more processors 310 executes software and/or firmware. The description herein may refer to the one or more processors 310 performing a function as shorthand for one or more of the processors contained in the one or more processors 310 performing the function. The description herein may refer to the TRP 300 performing a function as shorthand for one or more appropriate components (e.g., the one or more processors 310 and the one or more memories 311) of the TRP 300 (and thus of one of the gNBs 110*a*, 110*b* and/or the ng-eNB 114) performing the function. The one or more processors 310 may include one or more memories with stored instructions in addition to and/or instead of the one or more memories 311. Functionality of the one or more processors 310 is discussed more fully below.

The one or more transceivers 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
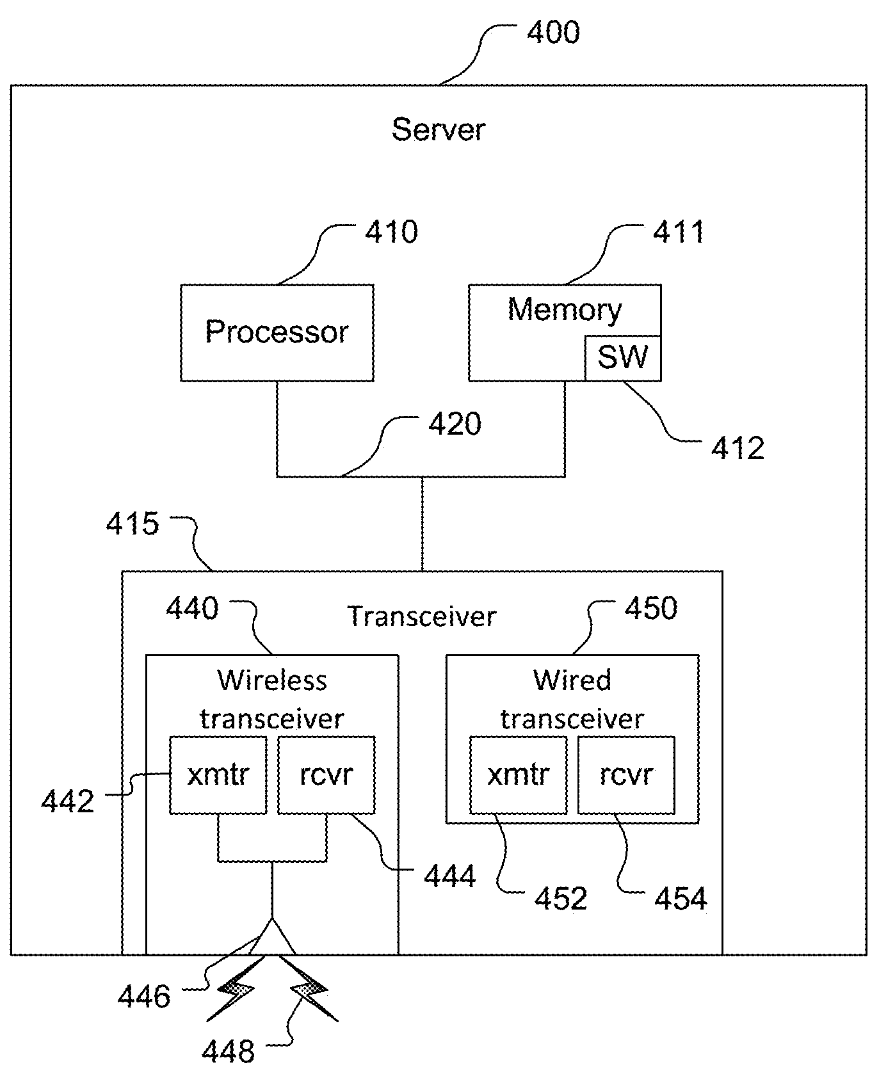
FIG. 4 is a block diagram of components of a server, various examples of which are shown in FIG. 1.

Referring also to FIG. 4, a server 400, of which the LMF 120 may be an example, may comprise a computing platform including one or more processors 410, one or more memories 411 including software (SW) 412, and a transceiver 415. The one or more processors 410, the one or more memories 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The one or more processors 410 may include one or more intelligent hardware devices, e.g., a central processing unit (CPU), a microcontroller, an application specific integrated circuit (ASIC), etc. The one or more processors 410 may comprise multiple processors (e.g., including a general-purpose/application processor, a DSP, a modem processor, a video processor, and/or a sensor processor as shown in FIG. 2). The one or more memories 411 may be a non-transitory storage medium that may include random access memory (RAM)), flash memory, disc memory, and/or read-only memory (ROM), etc. The one or more memories 411 may store the software 412 which may be processor-readable, processor-executable software code containing instructions that are configured to, when executed, cause the one or more processors 410 to perform various functions described herein. Alternatively, the software 412 may not be directly executable by the one or more processors 410 but may be configured to cause the one or more processors 410, e.g., when compiled and executed, to perform the functions. The description herein may refer to the one or more processors 410 performing a function, but this includes other implementations such as where the one or more processors 410 executes software and/or firmware. The description herein may refer to the one or more processors 410 performing a function as shorthand for one or more of the processors contained in the one or more processors 410 performing the function. The description herein may refer to the server 400 performing a function as shorthand for one or more appropriate components of the server 400 performing the function. The one or more processors 410 may include one or more memories with stored instructions in addition to and/or instead of the one or more memories 411. Functionality of the one or more processors 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the one or more processors 410 performing a function, but this includes other implementations such as where the one or more processors 410 executes software (stored in the one or more memories 411) and/or firmware. The description herein may refer to the server 400 performing a function as shorthand for one or more appropriate components (e.g., the one or more processors 410 and the one or more memories 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records,' one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, and subtracting the $UE_{Rx\text{-}Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information—Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance." Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
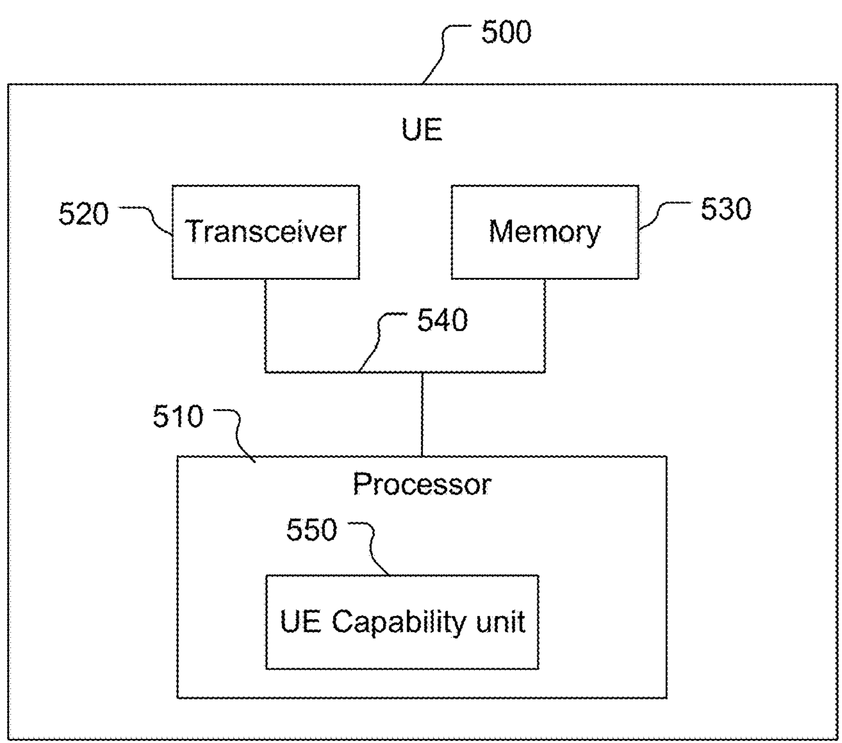
FIG. 5 is a simplified block diagram of an example user equipment.

Referring also to FIG. 5, a UE 500 includes one or more processors 510, one or more transceivers 520, and one or more memories 530 communicatively coupled to each other by a bus 540. Even if referred to in the singular, the one or more processors 510 may include one or more processors, the one or more transceiver 520 may include one or more transceivers (e.g., one or more transmitters and/or one or more receivers), and the one or more memories 530 may include one or more memories. The UE 500 may include the components shown in FIG. 5. The UE 500 may include one or more other components such as any of those shown in FIG. 2 such that the UE 200 may be an example of the UE 500. For example, the one or more processors 510 may include one or more of the components of the one or more processors 210. The one or more transceivers 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the one or more transceivers 520 may include the wired transmitter 252 and/or the wired receiver 254. The one or more memories 530 may be configured similarly to the one or more memories 211, e.g., including software with processor-readable instructions configured to cause the one or more processors 510 to perform functions.

The description herein may refer to the one or more processors 510 performing a function, but this includes other implementations such as where the one or more processors 510 executes software (stored in the one or more memories 530) and/or firmware. The description herein may refer to the UE 500 performing a function as shorthand for one or more appropriate components (e.g., the one or more processors 510 and the one or more memories 530) of the UE 500 performing the function. The one or more processors 510 (possibly in conjunction with the one or more memories 530 and, as appropriate, the one or more transceivers 520) may include a UE capability unit 550. The UE capability unit 550 may be configured to generate UE capability messages that indicate one or more capabilities of the UE 500. The UE capability unit 550 is discussed further below with reference to FIG. 13, and the description may refer to the one or more processors 510 generally, or the UE 500 generally, as performing any of the functions of the UE capability unit 550, with the UE 500 being configured to perform the function(s).

Figure 6:
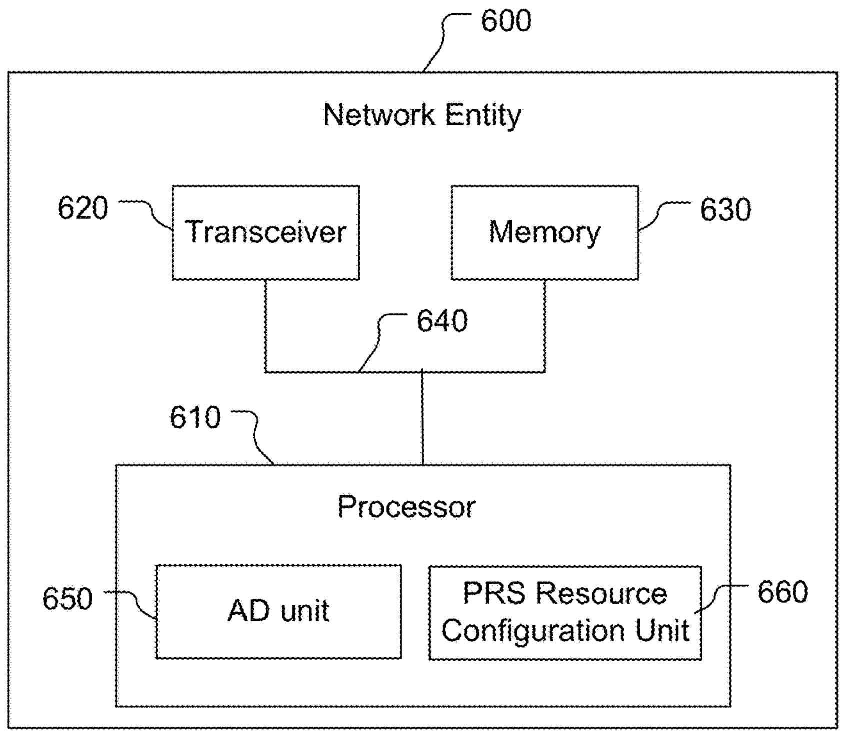
FIG. 6 is a simplified block diagram of an example network entity.

Referring also to FIG. 6, a network entity 600 includes one or more processors 610, one or more transceivers 620, and one or more memories 630 communicatively coupled to each other by a bus 640. Even if referred to in the singular, the network entity 600 may include one or more network entities, the one or more processors 610 may include one or more processors, the one or more transceivers 620 may include one or more transceivers (e.g., one or more transmitters and/or one or more receivers), and the one or more memories 630 may include one or more memories. The network entity 600 may include the components shown in FIG. 6 and may be configured to be a component of a communication network (e.g., a terrestrial communication network such as a cellular network). The network entity 600 may include one or more other components such as any of those shown in FIG. 4 such that the server 400 (e.g., the LMF 120) may be an example of the network entity 600. For example, the one or more processors 610 may include one or more of the components of the one or more processors 410. The one or more transceivers 620 may include one or more of the components of the transceiver 415. The one or more memories 630 may be configured similarly to the one or more memories 411, e.g., including software with processor-readable instructions configured to cause the one or more processors 610 to perform functions. Also or alternatively, the network entity 600 may include one or more other components such that the LMF 120 may be an example of the network entity 600.

The description herein may refer to the one or more processors 610 performing a function, but this includes other implementations such as where the one or more processors 610 executes software (stored in the one or more memories 630) and/or firmware. The description herein may refer to the network entity 600 performing a function as shorthand for one or more appropriate components (e.g., the one or more processors 610 and the one or more memories 630) of the network entity 600 performing the function. The one or more processors 610 (possibly in conjunction with the one or more memories 630 and, as appropriate, the one or more transceivers 620) may include an Assistance Data (AD) unit 650 and a PRS Resource Configuration Unit 660. The AD unit 650 and the PRS Resource Configuration Unit 660 are discussed further below with reference to FIG. 13, and the description may refer to the one or more processors 610 generally, or the network entity 600 generally, as performing any of the functions of the AD unit 650 and the PRS Resource Configuration Unit 660, with the network entity 600 being configured to perform the function(s).

Multiple Antenna PRS Transmission and Reception

Figure 7:
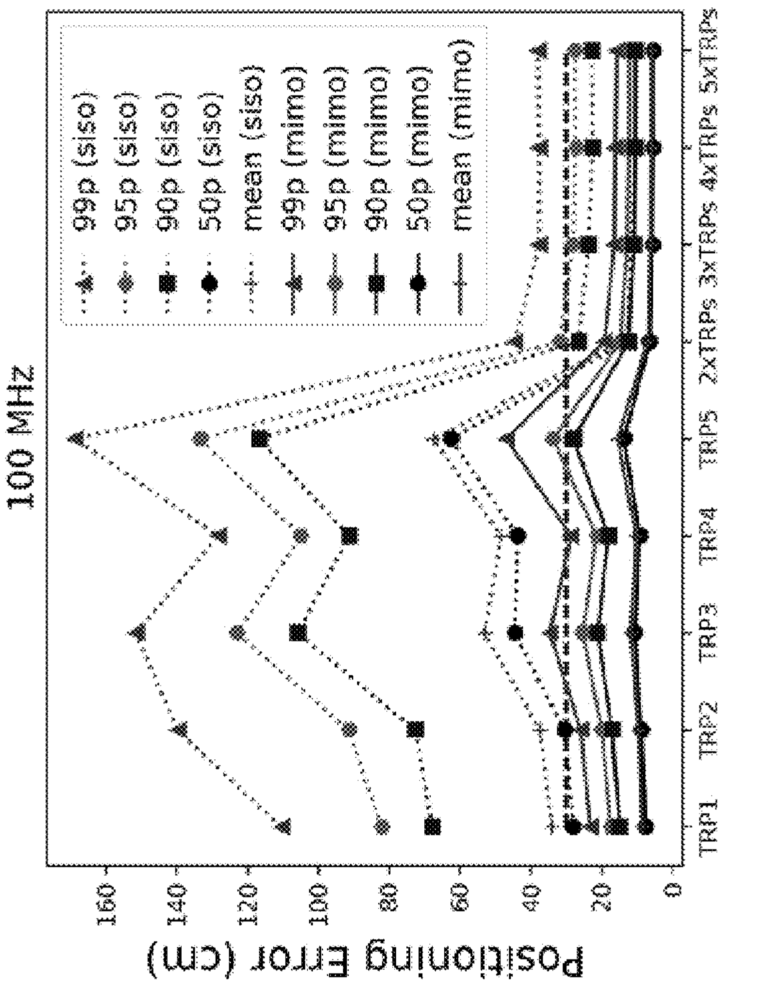
FIG. 7 is a chart showing the positioning performance by an AI/ML model for single and multiple antenna transmissions.

In challenging environments, such as indoor environments, positioning performance may be reduced due to non-line of sight between the UE 500 and the TRP 300. Non-line of sight may lead to radio signals being blocked or reflected by obstacles, such as buildings. Blocked or reflected (multipath) signal propagation may result in incomplete and/or distorted PRS signal information. Data-driven methods, such as Artificial Intelligence/Machine Learning (AI/ML) models, may be implemented to transform measurements obtained from the signals to position estimates. Measurements from multiple transmission antennas on the TRP side, and/or multiple reception antennas on the UE side, where the UE 500 may distinguish between the transmission antennas as sources of PRS, may provide a richer data set for the AI/ML models, leading to more accurate positioning. FIG. 7 is a chart showing the positioning performance by an AI/ML model for single and multiple antenna transmissions. As shown, use of measurements from multiple transmission antennas, such as in a MIMO configuration, result in lower positioning errors.

To implement enhancements to PRS transmission, multiple antennas for PRS transmission (TX) may be configured at the TRP side using Frequency Division Multiplexing (FDM), where TX antennas are configured with different Positioning Frequency Layers (PFLs). Multiple TX antennas may alternatively be configured with the same PFL but with different frequency offsets. To implement enhancements to PRS reception, multiple antennas for PRS reception may be configured at the UE side, with or without sequential antenna reception. UE and TRP capability signaling and assistance data to configure the mapping of PRS measurements to sourcing TX antennas/receiving RX antennas pairs are described further below.

Figure 8A:
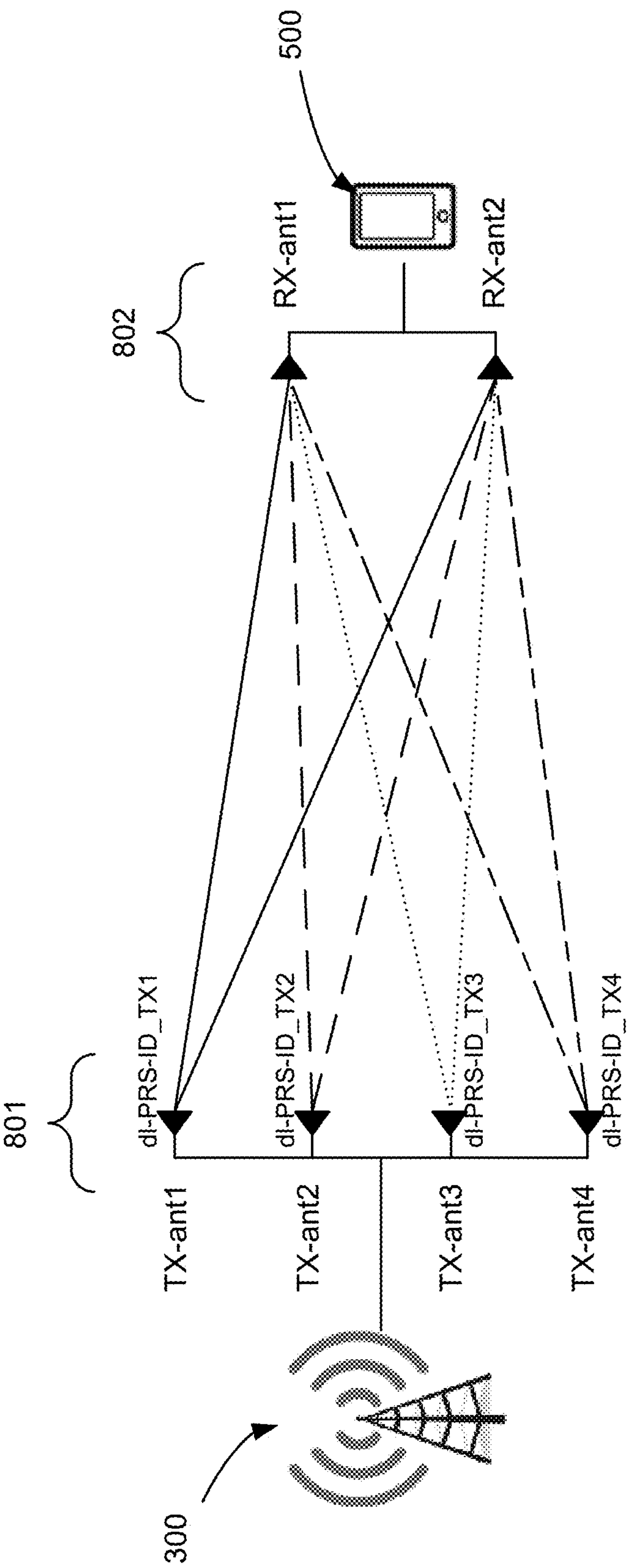
FIGS. 8A-8B illustrate an example multiple input/multiple output (MIMO) configuration for multiple antenna PRS transmission and reception.
Figure 8B:
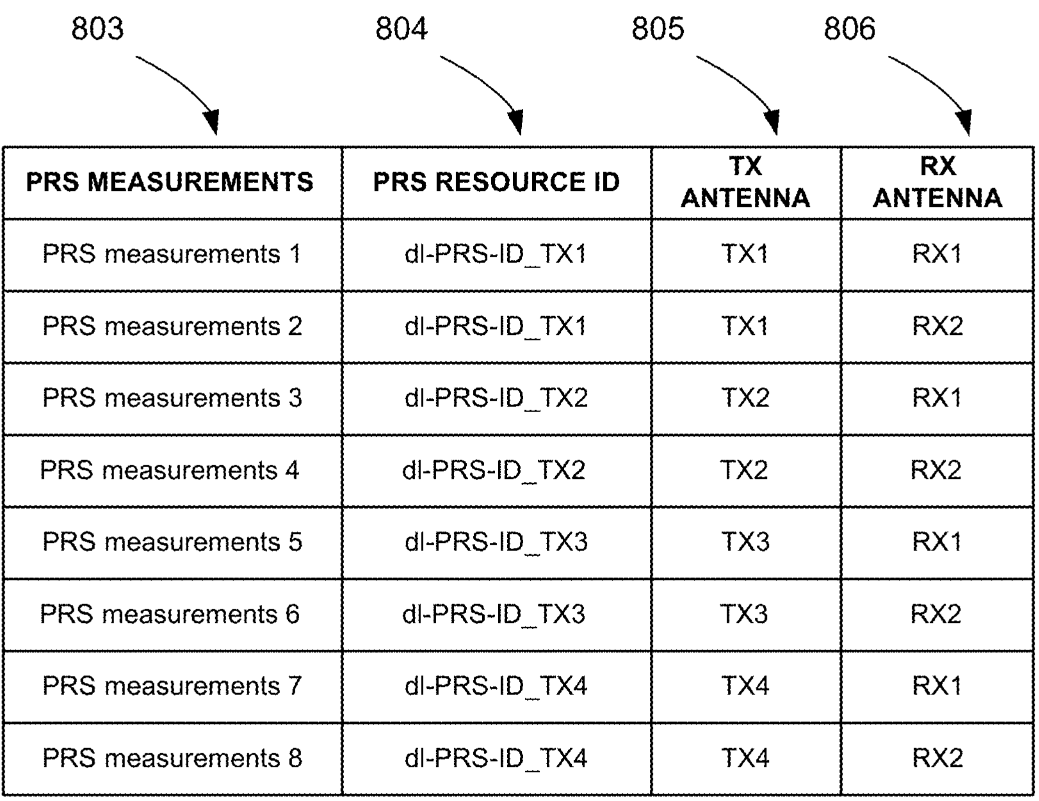

FIGS. 8A-10B illustrate example multiple antenna transmission and reception configurations. FIG. 8A illustrates an example multiple input/multiple output (MIMO) configuration for multiple antenna PRS transmission and reception, with multiple TX antennas configured for the TRP 300 and multiple corresponding RX antennas configured for the UE 500. In this example, multiple TX antennas 801 of the TRP 300 include TX-ant1, TX-ant2, TX-ant3, and TX-ant4. Multiple corresponding RX antennas 802 of the UE 500 include RX-ant1 and RX-ant2. Each TX antenna 801 (TX-ant1, TX-ant2, TX-ant3, TX-ant4) is assigned a different PFL, or assigned the same PFL but with different frequency offsets, with each TX antenna 801 associated with a PRS resource ID which incorporates a TX antenna ID. For example, TX-ant1 may be assigned a PRS resource with an ID of d1-PRS-ID_TX1; TX-ant2 may be assigned a PRS resource with an ID of d1-PRS-ID_TX2; TX-ant3 may be assigned a PRS resource with an ID of d1-PRS-ID_TX3; and TX-ant4 may be assigned a PRS resource with an ID of d1-PRS-ID_TX4. Multiple TX antennas 801 of the TRP 300 transmit PRS signals to multiple RX antennas 802 of the UE 500. In this example, multiple RX antennas 802 of the UE 500 include RX-ant1 and RX-ant2. PRS signals from each TX antenna 801 of the TRP 300 are received by each RX antenna 802 of the UE 500. Referring to FIG. 8B, in the MIMO configuration of FIG. 8A, PRS measurements 803 may be obtained from PRS signals from the TRP 300 and received by the UE 500. Each PRS measurement 803 may be associated with one of the TX antennas 805 as a PRS source antenna (i.e., one of the TX antennas 801 that transmitted the PRS from which the associated PRS measurement 803 is obtained), using the PRS resource ID 804. Each PRS measurement 803 may also be associated with one of the RX antennas 806 as a PRS reception antenna (i.e., one of the RX antennas 802 that received the PRS from which the associated PRS measurement 803 is obtained). Although FIG. 8A illustrates four TX antennas and two RX antennas, other numbers of TX and RX antennas may be used for the MIMO PRS configuration.

Figure 9A:
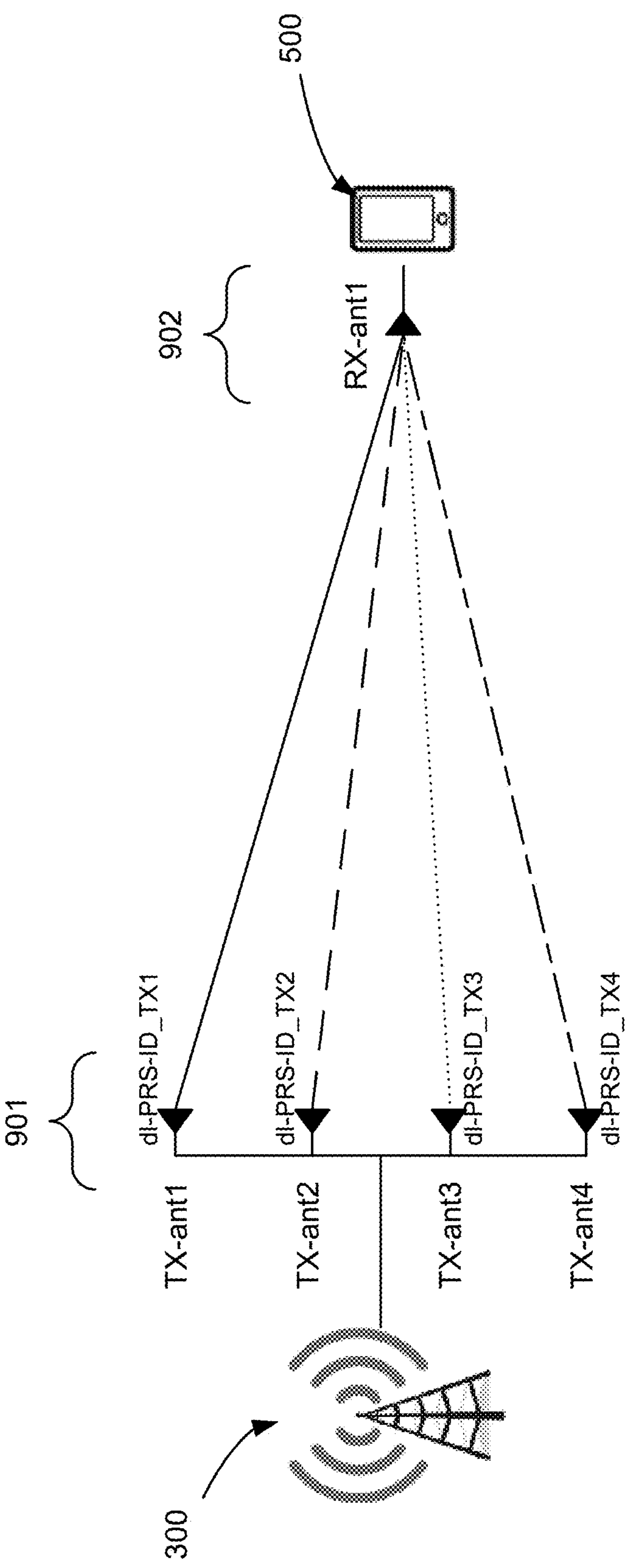

FIG. 9A illustrates an example multiple input/single output (MISO) multiple antenna PRS, with multiple TX antennas 901 configured for the TRP 300 and a single corresponding RX antenna 902 configured for the UE 500. In this example, multiple TX antennas 901 of the TRP 300 include TX-ant1, TX-ant2, TX-ant3, and TX-ant4. The corresponding single RX antenna 902 of the UE 500 includes RX-ant1. As with the configuration of FIG. 8A, each TX antenna 901 (TX-ant1, TX-ant2, TX-ant3, TX-ant4) is assigned a different PFL, or assigned the same PFL but with different frequency offsets, with each TX antenna 901 associated with a different PRS resource ID (d1-PRS-ID_TX1; d1-PRS-ID_TX2; d1-PRS-ID_TX3; d1-PRS-ID_TX4) which incorporates a TX antenna ID. Multiple TX antennas 901 of the TRP 300 transmit PRS signals to the single RX antenna 902 of the UE 500. Referring to FIG. 9B, in the MISO PRS configuration of FIG. 9A, PRS measurements 903 may be obtained from PRS signals from the TRP 300 and received by the UE 500. Using the identity of the TX antenna incorporated in the PRS resource ID 904, each PRS measurement 903 may be associated with one of the TX antennas 905 as a PRS source antenna (i.e., one of the TX antennas 901 that transmitted the PRS from which the associated PRS measurement 903 is obtained). Each PRS measurement 903 may also be associated with the RX antenna 906 as a PRS reception antenna (i.e., the RX antenna 902 that received the PRS from which the associated PRS measurement 903 is obtained). Although FIG. 9A illustrates four TX antennas, other numbers of TX antennas may be used for the MISO PRS configuration.

Figure 10A:
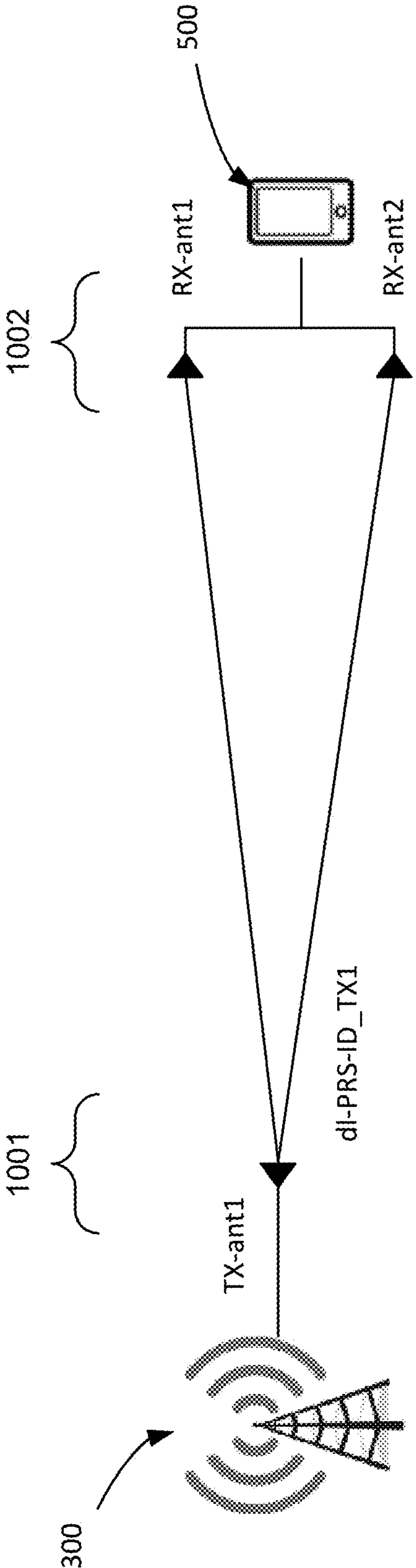
FIGS. 10A-10B illustrate an example single input/multiple output (SIMO) multiple antenna PRS.
Figure 10B:
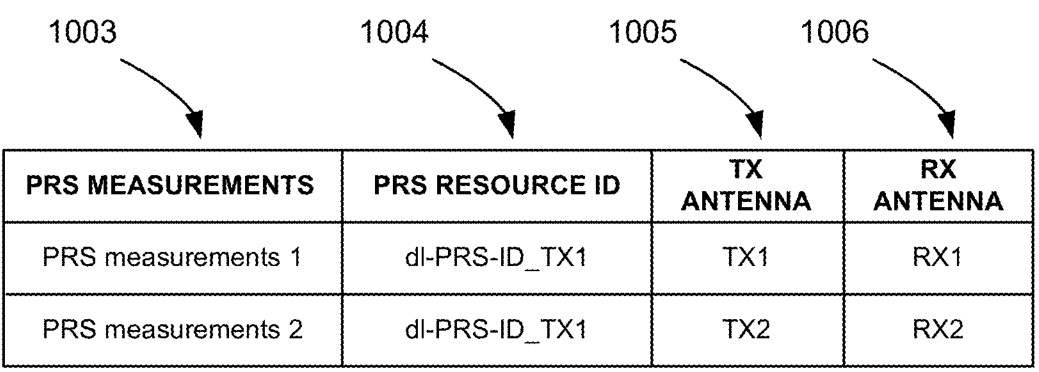

FIGS. 10A-10B illustrate an example single input/multiple output (SIMO) multiple antenna PRS, with multiple RX antennas 1002 configured for the UE 500 and a single corresponding TX antenna 1001 configured for the TRP 300. Referring to FIG. 10A, in this example, a single TX antenna 1001 (TX-ant1) of the TRP 300 corresponds to multiple RX antennas 1002 (RX-ant1, RX-ant2) of the UE 500. The TX antenna 1001 (TX-ant1) of the TRP 300 transmits PRS signals to each RX antenna 1002 (RX-ant1, RX-ant2) of the UE 500. Referring to FIG. 10B, in the SIMO PRS configuration of FIG. 10A, PRS measurements 1003 may be obtained from PRS signals from the TRP 300 and received by the UE 500. Using the identity of the TX antenna incorporated in the PRS resource ID 1004, each PRS measurement 1003 may be associated with the TX antennas 1005 as a PRS source antenna (i.e., the TX antenna 1001 that transmitted the PRS from which the associated PRS measurement 1003 is obtained). Each PRS measurement 1003 may also be associated with one of the RX antennas 1006 as a PRS reception antenna (i.e., one of the RX antennas 1002 that received the PRS from which the associated PRS measurement 1003 is obtained). Although FIG. 10A illustrates two RX antennas, other numbers of RX antennas may be used for the SIMO PRS configuration.

Figure 11:
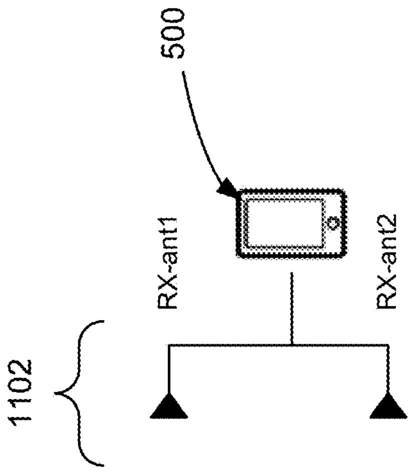
FIG. 11 illustrates an example implementation of multiple antennas positioning reference signal (PRS) transmissions using different PFLs.
Figure 11:
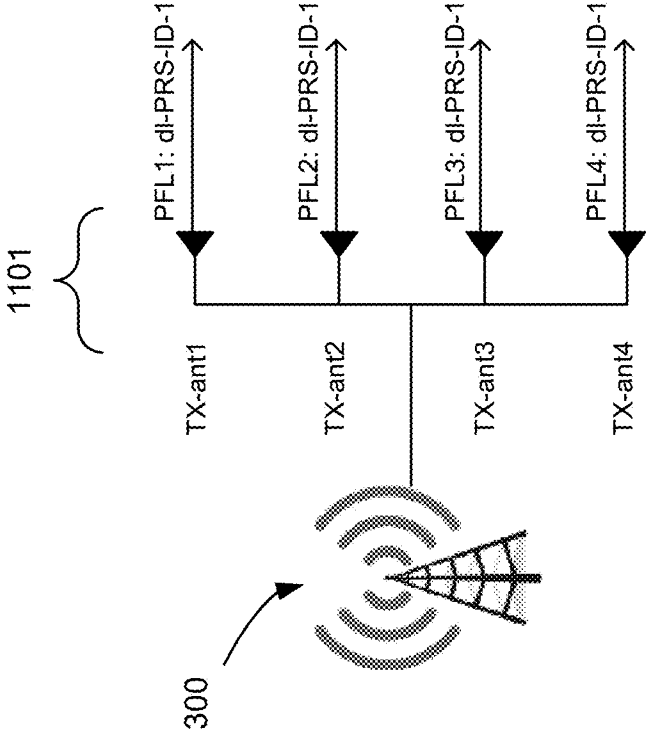

FIG. 11 illustrates the implementation of multiple antennas PRS transmissions using different PFLs. The TRP 300 may assign each TX antenna 1101 (TX-ant1, TX-ant2, TX-ant3, TX-ant4) with a different PFL (PFL1, PFL2, PFL3, PFL4), respectively. The TRP 300 transmits (e.g., simultaneously transmits) PRS signals via multiple PFLs using different TX antennas 1101. The RX antennas 1102 of the UE 500 receives the PRS signals sent via the PFLs from the different TX antennas 1101 and obtains measurements from the PRS signals. Based on the PFL of the PRS signals, the UE 500 may associate the PRS measurements with the sourcing TX antenna and the receiving RX antenna. In one implementation, the UE 500 may send a request to the network entity 600 to request that multiple antenna PRS transmissions be implemented by assigning each TX antenna with a different PFL. The UE 500 may indicate, for the network entity 600, the preferred bandwidth part (BWP) and frequency separation for the PFLs.

Figure 12A:
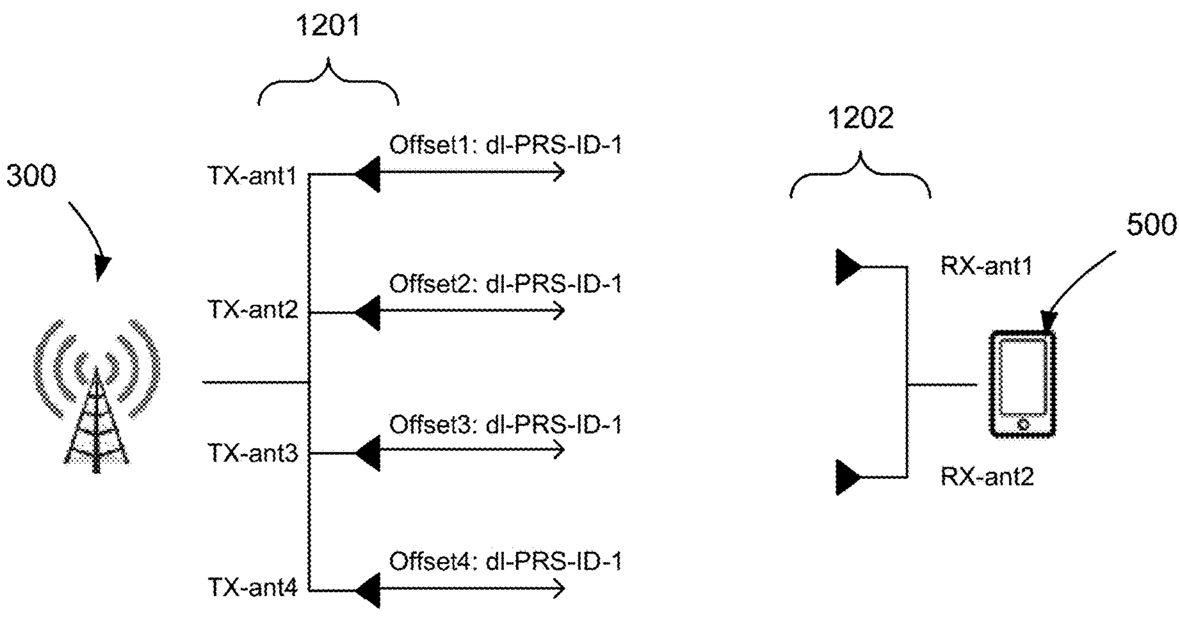
FIGS. 12A-12B illustrates an example implementation of multiple antennas PRS transmissions using frequency offsets.
Figure 12B:
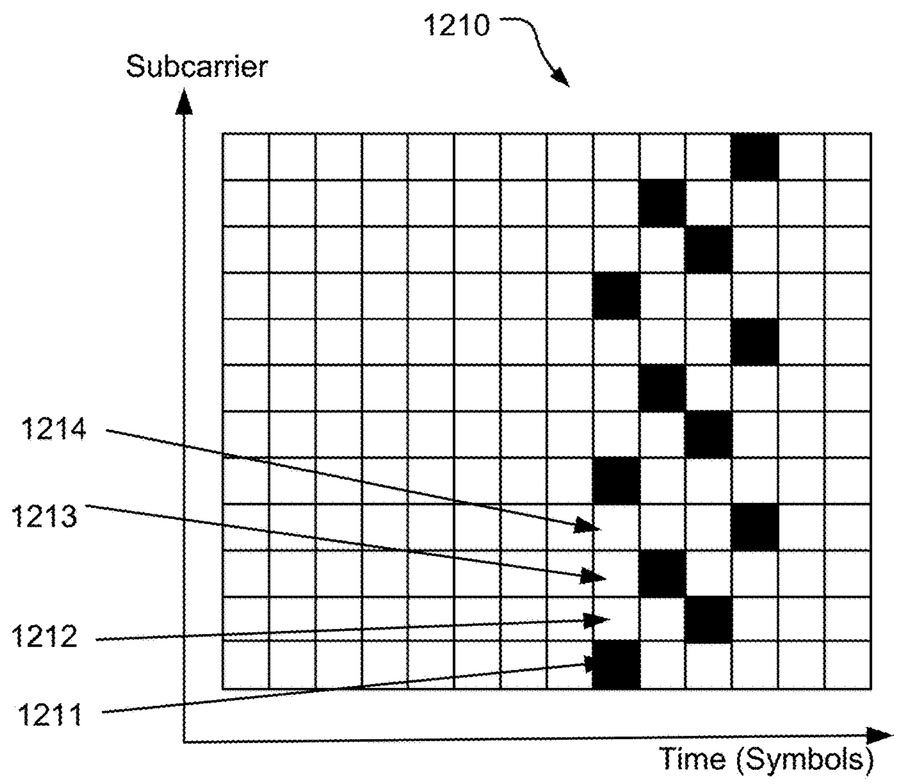

FIGS. 12A-12B illustrate the implementation of multiple antennas PRS transmissions using frequency offsets. Referring to FIG. 12A, the TRP 300 may assign each TX antenna 1201 (TX-ant1, TX-ant2, TX-ant3, TX-ant4) to a different subcarrier frequency offset. The TRP 300 transmits multiple PRS signals with different subcarrier offsets to different TX antennas 1201. The RX antennas 1202 (RX-ant1, RX-an52) of the UE 500 receives the PRS signals from the different TX antennas 1201 and obtains the measurements from the PRS signals. Based on the frequency offset, the UE 500 may associate the PRS measurements with the sourcing TX antenna and the receiving RX antenna. In one implementation, the UE 500 may send a request to the network entity 600 requesting that the multiple antenna PRS transmission be performed by assigning different TX antennas to different frequency offsets. The UE 500 may indicate, for the network entity 600, the preferred bandwidth part (BWP) and comb-size or frequency offsets.

FIG. 12B illustrates an example comb-4, 4 symbols transmission schedule for the example implementation of the multiple antennas PRS transmission configuration of FIG. 12A. In the transmission schedule 1210, columns represent different symbols, rows represent different subcarriers, and darkened blocks represent the Resource Elements (REs) in the PRS transmissions. PRS transmission from TX-ant1 may be configured to begin at RE 1211; PRS transmission from TX-ant2 may be configured to begin at RE 1212; PRS transmission from TX-ant3 may be configured to begin at RE 1213; and PRS transmission from TX-ant4 may be configured to begin at RE 1214. As shown by the darkened blocks, the PRS transmissions from the TX antennas 1201 (TX-ant1, TX-ant2, TX-ant3, TX-ant4) are offset by the subcarrier frequency.

To implement multiple antenna PRS reception, the UE 500 may be configured with multiple RX antennas or antenna panels. The UE 500 may receive and measure a PRS resource on multiple RX antennas according to at least two modes. In a first mode, the UE 500 may be configured with one RX RF chain or may only activate one RX RF chain at a time. The TRP 300 may send a repetition of the PRS resource on multiple occasions. The UE 500 switches the RX antennas or antenna panels on each PRS occasion and obtains measurements from the PRS signals received at the active RX antenna. The first mode may be implemented for a UE 500 with limited RX capabilities. In a second mode, the UE 500 may be configured without RX antenna switching, where the UE 500 receives PRS signals on multiple RX antennas simultaneously. The TRP 300 may be configured to send the PRS signals using one or a multiple of TX antennas. The UE 500 receives the PRS signals and obtains measurements from the PRS signals received at the multiple RX antennas. The UE 500 may indicate, for the network entity 600, the required multiple antenna PRS reception mode, along with any measurement or processing gap configurations. A measurement or processing gap refers to a gap in the transmission from the TRP 300 or the reception by the UE 500 during which the UE 500 may obtain measurements from the PRS signals.

Through explicit identification of TX antennas in the PRS resource ID, the UE 500 may differentiate between measurements obtained from PRS signals received from different TX antennas. By combining the measurements with the characteristics of the specific TX antenna and the characteristics of the specific RX antenna, more accurate positioning may be realized.

Figure 13:
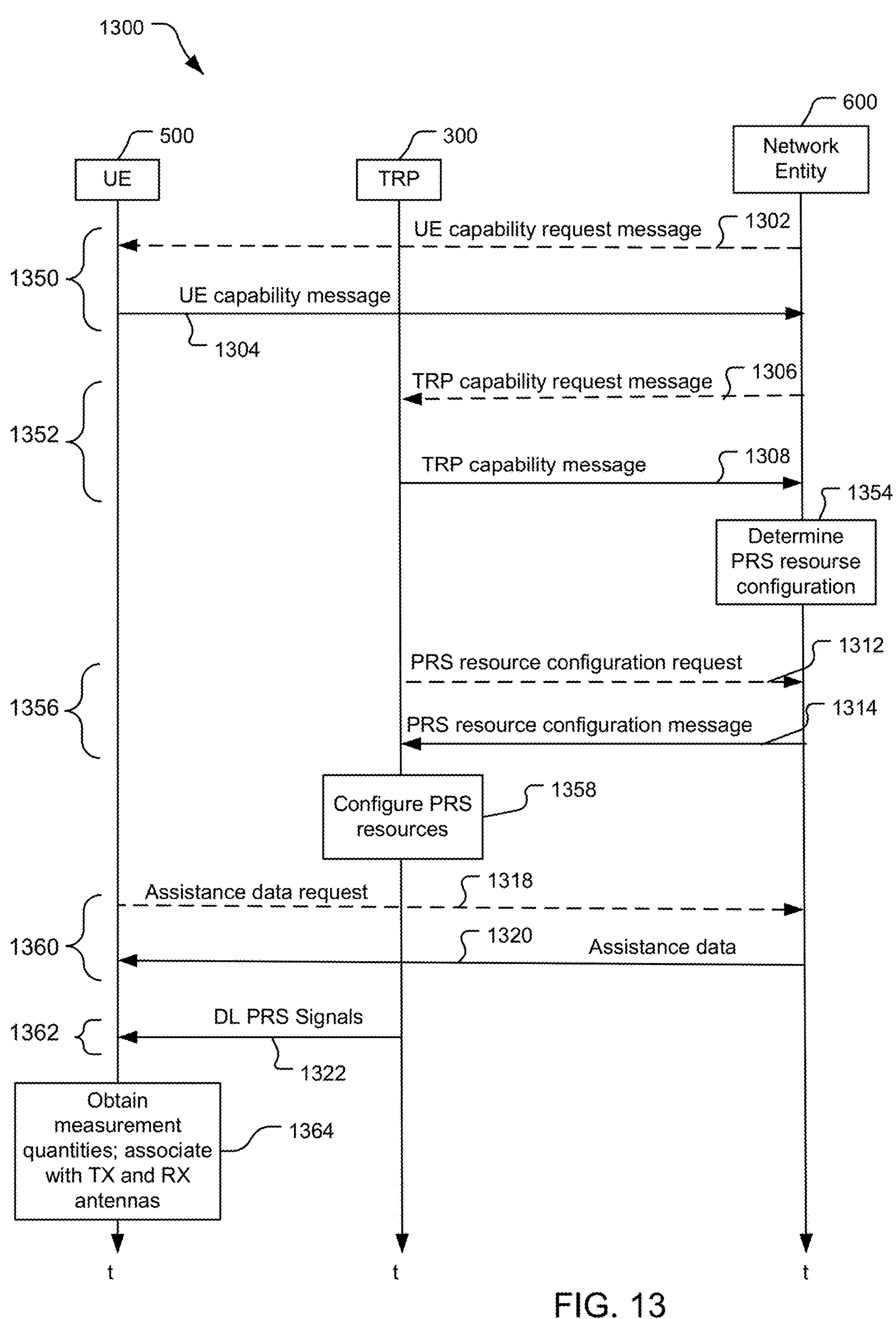
FIG. 13 is an example message flow for configuring a user equipment and a transmission/reception point for multiple antenna PRS transmission and reception/

FIG. 13 illustrates a message flow for configuring a UE 300 and a TRP 300 for multiple antenna PRS transmission and reception. The flow 1300 illustrates messages between the UE 500, the TRP 300, and the network entity 600. The messages may be sent using the LPP. LPPa, NPPa, or the NRPPa capability exchange procedure and may include other information defined by the LPP. LPPa, NPPa, or NRPPa protocols. The flow 1300 is an example flow and not limiting. The flow 1300 may be altered, e.g., by having one or more messages and/or one or more stages added, removed, rearranged, combined, performed concurrently, and/or having one or more messages and/or one or more stages split into multiple messages and/or stages. At stage 1350, the UE 500 indicates, to the network entity 600 (e.g., the LMF 120) the UE's capability to support multiple antenna PRS processing by including the UE's capabilities in a UE capability message 1304, generated by the UE capability unit 650, to the network entity 600. The UE capability message 1304 may be sent in response to a UE capability request message 1302 from the network entity 600. The UE capability message 1304 may include the multiple antenna PRS modes supported by the UE 500 (e.g., one or more capabilities of the UE 500 to receive MIMO PRS, MISO PRS, and/or SIMO PRS transmissions), the multiple antenna PRS transmission modes supported by the UE 500 (e.g., one or more capabilities of the UE 500 to receive MIMO/MISO PRS transmissions sent with different PFL transmission), and/or the multiple antenna PRS reception modes supported by the UE 500 (e.g., one or more capabilities of the UE 500 to receive MIMO/SIMO PRS transmission with or without RX antenna switching). The UE capability message 1304 may further include the maximum number of TX and/or RX antennas supported by the UE 500 and configurations for measurement or processing gaps. Optionally, the UE capability message 1304 may include a UE request or preference for a given multiple antenna PRS transmission mode or multiple antenna PRS reception mode. In an example, the UE 500 may be configured to provide an on-demand request for PRS positioning (e.g., without receiving the UE capability request message 1302), and the UE capabilities information may be included in the on-demand request.

In stage 1352, the TRP 300 indicates, to the network entity 600 (e.g., the LMF 120) the TRP's capability to support multiple antenna PRS transmission by including the TRP's capabilities in a TRP capability message 1308, generated by the TRP capabilities unit 313, to the network entity 600. The TRP capability message 1308 may further include other PRS-related configuration capabilities defined in the NRPP or NRPPa specifications. The TRP capability message 1308 may be sent in response to a TRP capability request message 1306 from the network entity 600. The TRP capability message 1308 may include the multiple antenna PRS transmission modes supported by the TRP 300 (e.g., one or more capabilities of the TRP 300 to support MIMO/MISO PRS transmissions sent with multiple TX antennas assigned to different PFLs or assigned the same PFL with different frequency offsets). The TRP capability message 1308 may further include the maximum number of TX antennas supported by the TRP 300.

In stage 1354, the PRS resource configuration unit 660 of the network entity 600 (e.g., the LMF 120) allocates the PRS resources based on UE and TRP capabilities as provided in the UE capability message 1304 and the TRP capability message 1308. In stage 1356, the network entity 600 sends a PRS resource configuration message 1314 to the TRP 300 that includes the PRS resource configuration. The PRS resource configuration message 1314 may include information regarding the PRS resource allocation for a multiple antenna PRS transmission mode (e.g., multiple antenna PRS transmission with different PFLs or same PFL with different frequency offsets). The PRS resource configuration message 1314 may further include other information currently included in the NPPa or NRPPa protocols. The PRS resource configuration message 1314 may be sent in response to a PRS resource configuration request 1312 from the TRP 300. In stage 1358, the TRP 300 configures the PRS resources using the resource allocation information in the PRS resource configuration message 1314.

In stage 1360, the network entity 600 sends assistance data 1320, generated by the AD unit 650, to the UE 500. The assistance data 1320 may include information to help the UE 500 configure the multiple antenna PRS mode (e.g., MIMO PRS, MISO PRS, or SIMO PRS), configure the multiple antenna PRS transmission mode (e.g., configure the UE 500 to receive multiple antenna PRS transmission with different PFLs or the same PFL with different frequency offsets), and/or configure the multiple antenna PRS reception mode (e.g., configure the UE 500 to perform or not perform sequential RX reception; configure the UE 500 for PRS repetition when the UE 500 performs sequential RX reception; or configure the order in which the UE 500 performs antenna switching in multiple antenna PRS reception). The assistance data 1320 may further include information to configure measurement or processing gaps for the UE 500. The assistance data 1320 may be sent in response to an assistance data request 1318 from the UE 500.

In stage 1362, the TRP 300 sends the DL PRS signals 1322 to the UE 500. The DL PRS signals 1322 may be sent by the TRP 300 using one or more TX antennas according to the PRS resource configuration from the network entity 600. In stage 1364, the UE 500 may receive the DL PRS signals 1322 using one or more RX antennas according to the assistance data 1320, and obtains measurements from the DL PRS signals 1322. The UE 500 may further associate each measurement with one of the TX antennas as a PRS source antenna (i.e., the TX antenna that transmitted the PRS from which the associated PRS measurement is obtained) and one of the RX antennas as a PRS reception antenna (i.e., the RX antenna that received the PRS from which the associated PRS measurement is obtained). Estimates of the position of the UE 500 may then be determined using one or more of the position techniques described above.

Figure 14:
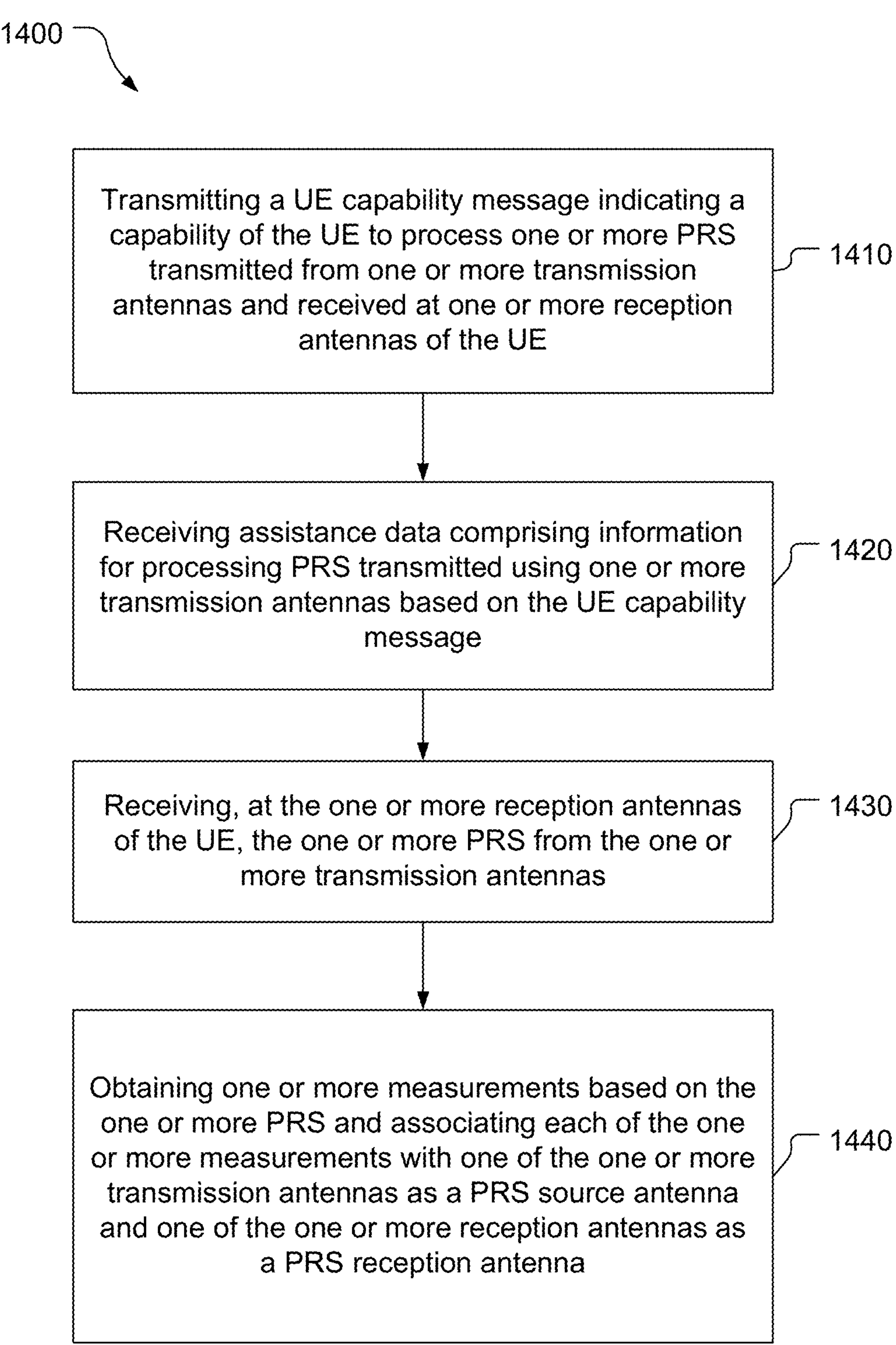
FIG. 14 is an example process flow diagram of a signal transfer method for configuring a user equipment for multiple antenna PRS reception.

Referring to FIG. 14, with further reference to FIGS. 5 and 13, a signal transfer method 1400 for configuring a UE 500 for multiple antenna PRS reception includes the stages shown. The method 1400 is, however, an example only and not limiting. The method 1400 may be altered, e.g., by having one or more stages added, removed, rearranged, combined, performed concurrently, and/or by having one or more single stages split into multiple stages.

At stage 1410, the method 1400 includes transmitting a UE capability message 1304 indicating a capability of the UE 500 to process one or more PRS transmitted from one or more transmission antennas and received at one or more reception antennas of the UE 500. The UE 500, including the one or more processors 510 and the one or more transceivers 520, is a means for transmitting one or more capability messages. The UE capability message 1304 may include the multiple antenna PRS modes supported by the UE 500 (e.g., one or more capabilities of the UE 500 to receive MIMO PRS, MISO PRS, and/or SIMO PRS transmissions), the multiple antenna PRS transmission modes supported by the UE 500 (e.g., one or more capabilities of the UE 500 to receive MIMO/MISO PRS transmissions sent with different PFL transmission), and/or the multiple antenna PRS reception modes supported by the UE 500 (e.g., one or more capabilities of the UE 500 to receive MIMO/SIMO PRS transmission with or without RX antenna switching). The UE capability message 1304 may further include the maximum number of TX and/or RX antennas supported by the UE 500 and configurations for measurement or processing gaps. Optionally, the UE capability message 1304 may include a UE request or preference for a given multiple antenna PRS transmission mode or multiple antenna PRS reception mode. The UE capability message 1304 may utilize network protocols (e.g., LPP/LPPa) and/or other over-the-air signaling techniques. In an example, a network entity 600 (e.g., the LMF 120) is configured to receive the one or more UE capability messages and generate assistance data for processing multiple antenna PRS transmissions. The UE capability message 1304 may be sent as a response to a UE capability request message 1302 from the network entity 600. In an example, the UE capability message 1304 may be included in an on-demand request for PRS positioning (e.g., a Mobile-Originated Location Request (MO-LR)).

At stage 1420, the method 1400 includes receiving assistance data 1320 comprising information for processing PRS from the one or more transmission antennas based on the UE capability message 1304. The UE 500, including the one or more processors 510 and the one or more transceivers 520, is a means for receiving the assistance data. The assistance data may include configuration information to enable the UE 500 to configure one or more multiple antenna PRS modes (e.g., MIMO PRS, MISO PRS, or SIMO PRS), configure the multiple antenna PRS transmission mode (e.g., configure the UE 500 to receive multiple antenna PRS transmission with different PFLs or the same PFL with different frequency offsets), configure multiple antenna PRS reception mode (e.g., configure the UE 500 to perform or not perform sequential RX reception, configure the UE 500 for PRS repetition when the UE 500 performs sequential RX reception, or configure the order in which the UE 500 performs antenna switching in multiple antenna PRS reception). The assistance data 1320 may further include information to configure measurement or processing gaps for the UE 500. The assistance data 1320 may be received as a response to an assistance data request 1318 sent to the network entity 600, and/or in response to an on-demand request (e.g., MO-LR) transmitted by the UE 500.

At stage 1430, the method 1400 includes, receiving, at the one or more reception antennas of the UE 500, the one or more PRS from the one or more transmission antennas. The UE 500, including the one or more processors 510 and the one or more transceivers 520, is a means for receiving the one or more PRS from the one or more transmission antennas at the one or more reception antennas of the UE 500.

At stage 1440, the method 1400 includes, obtaining one or more measurements based on the one or more PRS and associating each of the one or more measurements with one of the one or more transmission antennas as a PRS source antenna and one of the one or more reception antennas as a PRS reception antenna. A PRS source antenna may be the TX antenna that transmitted the one or more PRS from which an associated measurement is obtained. A PRS reception antenna may be the RX antenna that received the one or more PRS from which the associated measurement is obtained. The UE 500, including the one or more processors 510 and the one or more transceivers 520, is a means for obtaining the one or more measurements and associating each measurement with one of the one or more transmission antennas as a PRS source antenna and one of the one or more reception antennas as a PRS reception antenna.

Figure 15:
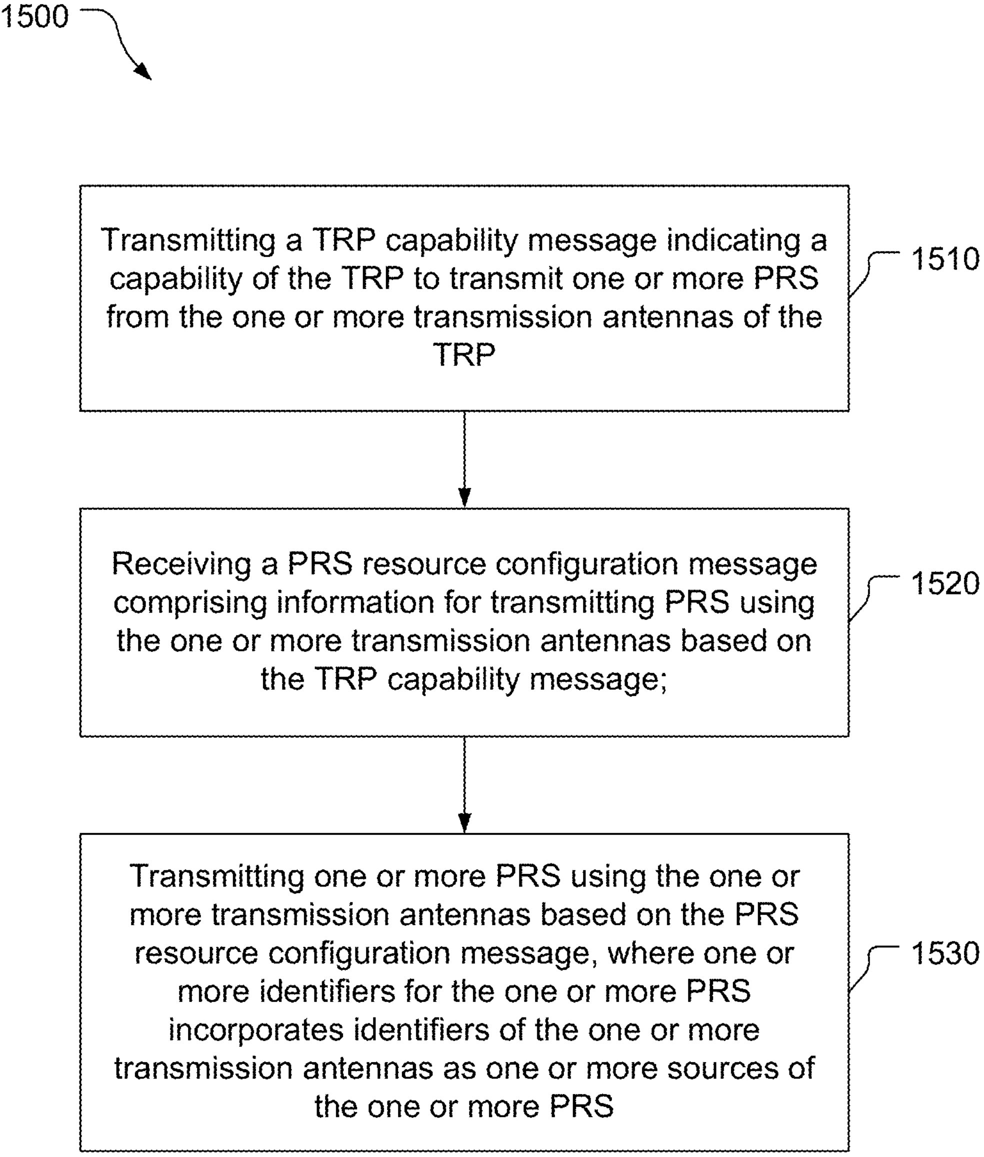
FIG. 15 is an example process flow diagram of a signal transfer method for configuring a transmission/reception point for multiple antenna PRS transmission.

Referring to FIG. 15, with further reference to FIGS. 3 and 13, a signal transfer method 1500 for configuring a TRP 300 for multiple antenna PRS transmission includes the stages shown. The method 1500 is, however, an example only and not limiting. The method 1500 may be altered, e.g., by having one or more stages added, removed, rearranged, combined, performed concurrently, and/or by having one or more single stages split into multiple stages. At stage 1510, the method 1500 includes transmitting a TRP capability message 1308 indicating a capability of the TRP 300 to transmit one or more PRS from the one or more transmission antennas of the TRP 300. The TRP 300, including the one or more processors 310 and the one or more transceivers 315, is a means for transmitting one or more TRP capability messages. The TRP capability message 1308 may utilize network protocols (e.g., NPPa/NRPPa) and/or other over-the-air signaling techniques. In an example, a network entity 600 (e.g., the LMF 120) is configured to receive the one or more TRP capability messages and generate PRS resource configuration messages for configuring PRS resources at the TRP 300. The TRP capability message 1308 may include the TRP's capabilities, generated by the TRP capabilities unit 313. The TRP capability message 1308 may further include other PRS-related configuration capabilities defined in the NRPP or NRPPa specifications. The TRP capability message 1308 may be sent as a response to a TRP capability request message 1306 from the network entity 600. At stage 1520, the method 1500 includes receiving a PRS resource configuration message 1314 comprising information for transmitting the PRS using the one or more transmission antennas based on the TRP capability message 1308. The TRP 300, including the one or more processors 310 and the one or more transceivers 315, is a means for receiving the PRS resource configuration message 1314. The PRS resource configuration message 1314 may include information regarding the PRS resource allocation for a multiple antenna PRS transmission mode (e.g., multiple antenna PRS transmission with different PFLs or same PFL with different frequency offsets). The PRS resource configuration message 1314 may further include other information currently included in the NPPa or NRPPa protocols. The PRS resource configuration message 1314 may be received as a response to a PRS resource configuration request 1312 sent to the network entity 600. At stage 1530, the method 1500 includes transmitting one or more PRS using the one or more transmission antennas based on the PRS resource configuration message, where one or more identifiers for the one or more PRS incorporates identifiers of the one or more transmission antennas as one or more sources of the one or more PRS. The TRP 300, including the one or more processors 310 and the one or more transceivers 315, is a means for transmitting the one or more PRS using the one or more transmission antennas based on the PRS resource configuration message.

Figure 16:
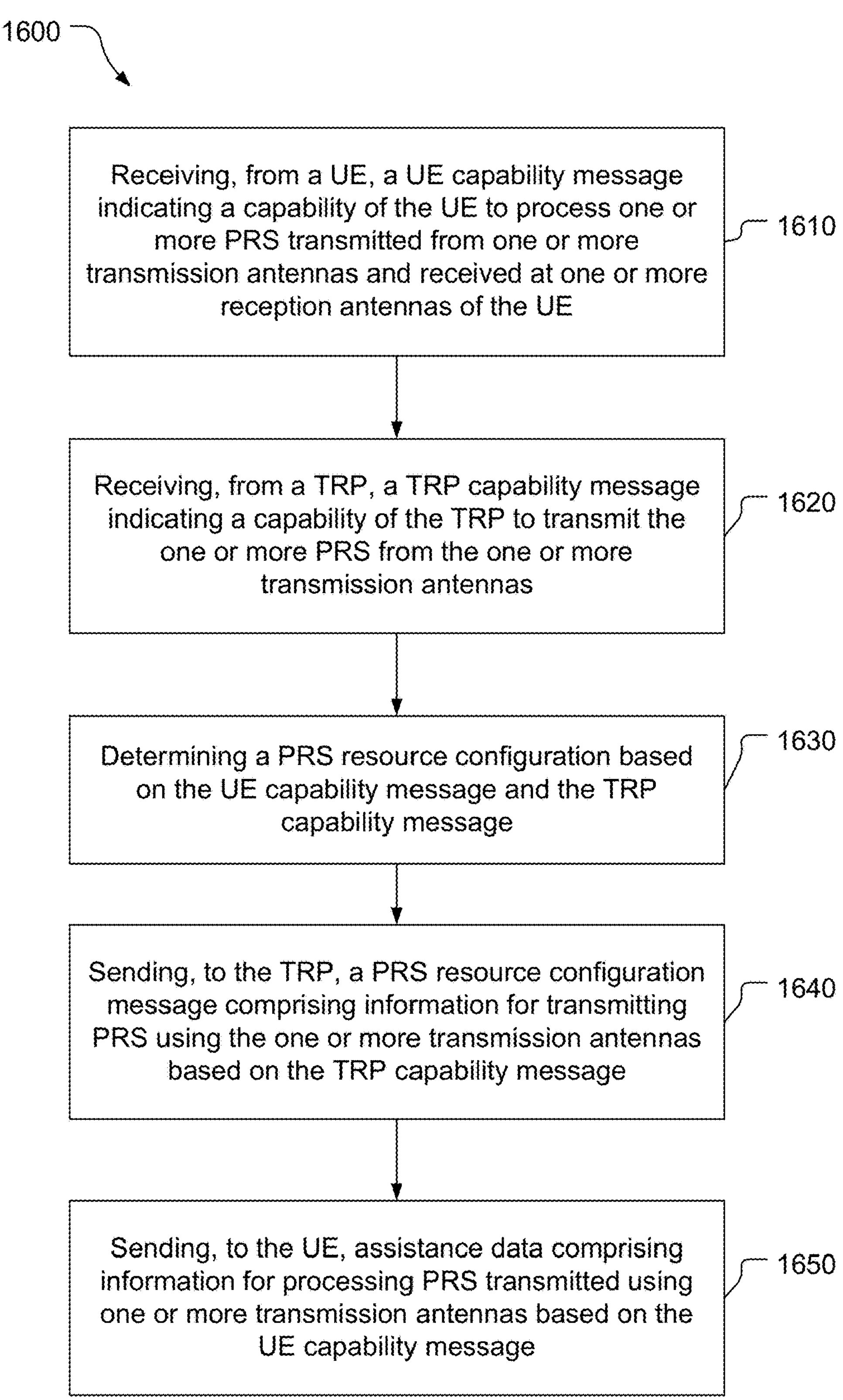
FIG. 16 is an example process flow diagram of a signal transfer method for configuring a transmission/reception point and a user equipment for multiple antenna PRS transmission and reception.

Referring to FIG. 16, with further reference to FIGS. 6 and 13, a signal transfer method 1600 for a network entity 600 to configure a TRP 300 and a UE 500 for multiple antenna PRS transmission and reception includes the stages shown. The method 1600 is, however, an example only and not limiting. The method 1600 may be altered, e.g., by having one or more stages added, removed, rearranged, combined, performed concurrently, and/or by having one or more single stages split into multiple stages. At stage 1610, the method 1600 includes receiving, from a UE 500, a UE capability message 1304 indicating a capability of the UE 500 to process one or more PRS transmitted from one or more transmission antennas and received at one or more reception antennas of the UE 500. The network entity 600 (e.g., the LMF 120), including the one or more processors 610 and the one or more transceivers 620, is a means for receiving the UE capability message 1304. The UE capability message 1304 may include the multiple antenna PRS modes supported by the UE 500 (e.g., one or more capabilities of the UE 500 to receive MIMO PRS, MISO PRS, and/or SIMO PRS transmissions), the multiple antenna PRS transmission modes supported by the UE 500 (e.g., one or more capabilities of the UE 500 to receive MIMO/MISO PRS transmissions sent with different PFL transmission), and/or the multiple antenna PRS reception modes supported by the UE 500 (e.g., one or more capabilities of the UE 500 to receive MIMO/SIMO PRS transmission with or without RX antenna switching). The UE capability message 1304 may further include the maximum number of TX and/or RX antennas supported by the UE 500 and configurations for measurement or processing gaps. Optionally, the UE capability message 1304 may include a UE request or preference for a given multiple antenna PRS transmission mode or multiple antenna PRS reception mode. The UE capability message 1304 may be received as a response to a UE capability request message 1302. At stage 1620, the method 1600 includes receiving, from a TRP 300, a TRP capability message 1308 indicating a capability of the TRP to transmit the one or more PRS from one or more transmission antennas. The network entity 600 (e.g., the LMF 120), including the one or more processors 610 and the one or more transceivers 620, is a means for receiving the TRP capability message 1308. The TRP capability message 1308 may include the TRP's capabilities, generated by the TRP capabilities unit 313. The TRP capability message 1308 may further include other PRS-related configuration capabilities defined in the NRPP or NRPPa specifications. The TRP capability message 1308 may be received as a response to a TRP capability request message 1306. At stage 1630, the method 1600 includes determining a PRS resource configuration based on the UE capability message 1304 and the TRP capability message 1308. The network entity 600 (e.g., the LMF 120), including the one or more processors 610, is a means for determining the PRS resource configuration. The PRS resource configuration may include the allocation of PRS resources based on the UE capability message 1304 and the TRP capability message 1308. At stage 1640, the method 1600 includes sending, to the TRP 300, a PRS resource configuration message 1314 comprising information for transmitting PRS using the one or more transmission antennas based on the TRP capability message 1308. The network entity 600 (e.g., the LMF 120), including the one or more processors 610 and the one or more transceivers 620, is a means for sending the PRS resource configuration message 1314. The PRS resource configuration message 1314 may include information regarding the PRS resource allocation for a multiple antenna PRS transmission mode (e.g., multiple antenna PRS transmission with different PFLs or same PFL with different frequency offsets). The PRS resource configuration message 1314 may further include other information currently included in the NPPa or NRPPa protocols. The PRS resource configuration message 1314 may be sent as a response to a PRS resource configuration request message 1312. At stage 1650, the method 1600 includes sending, to the UE 500, assistance data 1320 comprising information for processing PRS transmitted using the one or more transmission antennas based on the UE capability message 1304. The network entity 600 (e.g., the LMF 120), including the one or more processors 610 and the one or more transceivers 620, is means for sending the assistance data 1320. The assistance data 1320 may include information to help the UE 500 configure the multiple antenna PRS mode (e.g., MIMO PRS, MISO PRS, or SIMO PRS), configure the multiple antenna PRS transmission mode (e.g., configure the UE 500 to receive multiple antenna PRS transmission with different PFLs or the same PFL with different frequency offsets), and/or configure the multiple antenna PRS reception mode (e.g., configure the UE 500 to perform or not perform sequential RX reception; configure the UE 500 for PRS repetition when the UE 500 performs sequential RX reception; or configure the order in which the UE 500 performs antenna switching in multiple antenna PRS reception). The assistance data 1320 may further include information to configure measurement or processing gaps for the UE 500. The assistance data 1320 may be sent as a response to an assistance data request 1318.

IMPLEMENTATION EXAMPLES

Implementation examples are provided in the following numbered clauses.

Clause 1. A user equipment (UE), comprising: one or more memories; one or more reception antennas; one or more transceivers; and one or more processors, communicatively coupled to the one or more memories and the one or more transceivers, configured to: transmit, via the one or more transceivers, a UE capability message indicating a capability of the UE to process one or more positioning reference signals (PRS) transmitted from one or more transmission antennas and received at the one or more reception antennas; receive, via the one or more transceivers, assistance data comprising information for processing the one or more PRS transmitted using the one or more transmission antennas based on the UE capability message; receive, via the one or more reception antennas, the one or more PRS from the one or more transmission antennas; and obtain one or more measurements based on the one or more PRS and associate each of the one or more measurements with one of the one or more transmission antennas as a PRS source antenna and one of the one or more reception antennas as a PRS reception antenna.

Clause 2. The UE of clause 1, wherein the PRS source antenna comprises the one of the one or more transmission antennas that transmitted the one or more PRS from which the one or more associated measurements is obtained.

Clause 3. The UE of clause 1, wherein the PRS reception antenna comprises the one or more of the reception antennas that received the one or more PRS from which the one or more associated measurements is obtained.

Clause 4. The UE of clause 1, wherein the UE capability message indicates the capability of the UE to receive the one or more PRS transmitted by a plurality of transmission antennas, each transmission antenna configured with a different positioning frequency layer.

Clause 5. The UE of clause 1, wherein the UE capability message indicates the capability of the UE to receive the one or more PRS transmitted by a plurality of transmission antennas, each transmission antenna configured with a different frequency offset within a positioning frequency layer.

Clause 6. The UE of clause 1, wherein the UE capability message indicates the capability of the UE to receive the one or more PRS with antenna switching among a plurality of reception antennas.

Clause 7. The UE of clause 1, wherein the UE capability message indicates the capability of the UE to receive the one or more PRS without antenna switching among a plurality of reception antennas.

Clause 8. The UE of clause 1, wherein the UE capability message includes an on-demand request for PRS transmissions.

Clause 9. A signal transfer method, comprising: transmitting, from a user equipment (UE), a UE capability message indicating a capability of the UE to process one or more positioning reference signals (PRS) transmitted from one or more transmission antennas and received at one or more reception antennas of the UE; receiving, at the UE, assistance data comprising information for processing the one or more PRS transmitted using the one or more transmission antennas based on the UE capability message; receiving, at the one or more reception antennas of the UE, the one or more PRS from the one or more transmission antennas; and obtaining one or more measurements based on the one or more PRS and associating each of the one or more measurements with one of the one or more transmission antennas as a PRS source antenna and one of the one or more reception antennas as a PRS reception antenna.

Clause 10. The method of clause 9, wherein the PRS source antenna comprises the one of the one or more transmission antennas that transmitted the one or more PRS from which the one or more associated measurements is obtained.

Clause 11. The method of clause 9, wherein the PRS reception antenna comprises the one or more of the reception antennas that received the one or more PRS from which the one or more associated measurements is obtained.

Clause 12. The method of clause 9, wherein the UE capability message indicates the capability of the UE to receive the one or more PRS transmitted by a plurality of transmission antennas, each transmission antenna configured with a different positioning frequency layer.

Clause 13. The method of clause 9, wherein the UE capability message indicates the capability of the UE to receive the one or more PRS transmitted by a plurality of transmission antennas, each transmission antenna configured with a different frequency offset within a positioning frequency layer.

Clause 14. The method of clause 9, wherein the UE capability message indicates the capability of the UE to receive the one or more PRS with antenna switching among a plurality of reception antennas.

Clause 15. The method of clause 9, wherein the UE capability message indicates the capability of the UE to receive the one or more PRS without antenna switching among a plurality of reception antennas.

Clause 16. The method of clause 9, wherein the UE capability message includes an on-demand request for PRS transmissions.

Clause 17. A user equipment (UE), comprising: means for transmitting a UE capability message indicating a capability of the UE to process one or more positioning reference signals (PRS) transmitted from one or more transmission antennas and received at one or more reception antennas of the UE; means for receiving assistance data comprising information for processing the one or more PRS transmitted using the one or more transmission antennas based on the UE capability message; means for receiving the one or more PRS from the one or more transmission antennas; and means for obtaining one or more measurements based on the one or more PRS and associating each of the one or more measurements with one of the one or more transmission antennas as a PRS source antenna and one of the one or more reception antennas as a PRS reception antenna.

Clause 18. The UE of clause 17, wherein the PRS source antenna comprises the one of the one or more transmission antennas that transmitted the one or more PRS from which the associated one or more measurements is obtained.

Clause 19. The UE of clause 17, wherein the PRS reception antenna comprises the one or more of the reception antennas that received the one or more PRS from which the associated one or more measurements is obtained.

Clause 20. The UE of clause 17, wherein the UE capability message indicates the capability of the UE to receive the one or more PRS transmitted by a plurality of transmission antennas, each transmission antenna configured with a different positioning frequency layer.

Clause 21. The UE of clause 17, wherein the UE capability message indicates the capability of the UE to receive the one or more PRS transmitted by a plurality of transmission antennas, each transmission antenna configured with a different frequency offset within a positioning frequency layer.

Clause 22. The UE of clause 17, wherein the UE capability message indicates the capability of the UE to receive the one or more PRS with antenna switching among a plurality of reception antennas.

Clause 23. The UE of clause 17, wherein the UE capability message indicates the capability of the UE to receive the one or more PRS without antenna switching among a plurality of reception antennas.

Clause 24. The UE of clause 17, wherein the UE capability message includes an on-demand request for PRS transmissions.

Clause 25. A non-transitory, processor-readable storage medium comprising processor-readable instructions to cause one or more processors of a user equipment (UE) to: transmit a UE capability message indicating a capability of the UE to process one or more positioning reference signals (PRS) transmitted from one or more transmission antennas and received at one or more reception antennas of the UE; receive assistance data comprising information for processing the one or more PRS transmitted using the one or more transmission antennas based on the UE capability message; receive the one or more PRS from the one or more transmission antennas; and obtain one or more measurements based on the one or more PRS and associate each of the one or more measurements with one of the one or more transmission antennas as a PRS source antenna and one of the one or more reception antennas as a PRS reception antenna.

Clause 26. The medium of clause 25, wherein the UE capability message indicates the capability of the UE to receive the one or more PRS transmitted by a plurality of transmission antennas, each transmission antenna configured with a different positioning frequency layer.

Clause 27. The medium of clause 25, wherein the UE capability message indicates the capability of the UE to receive the one or more PRS transmitted by a plurality of transmission antennas, each transmission antenna configured with a different frequency offset within a positioning frequency layer.

Clause 28. The medium of clause 25, wherein the UE capability message indicates the capability of the UE to receive the one or more PRS with antenna switching among a plurality of reception antennas.

Clause 29. The medium of clause 25, wherein the UE capability message indicates the capability of the UE to receive the one or more PRS without antenna switching among a plurality of reception antennas.

Clause 30. The medium of clause 25, wherein the UE capability message includes an on-demand request for PRS transmissions.

Clause 31. A transmission/reception point (TRP), comprising: one or more memories; one or more transmission antennas; one or more transceivers; and one or more processors, communicatively coupled to the one or more memories and the one or more transceivers, configured to: transmit, via the one or more transceivers, a TRP capability message indicating a capability of the TRP to transmit one or more positioning reference signals (PRS) from the one or more transmission antennas; receive, via the one or more transceivers, a PRS resource configuration message comprising information for transmitting PRS using the one or more transmission antennas based on the TRP capability message; transmit, using the one or more transmission antennas, the one or more PRS based on the PRS resource configuration message, wherein one or more identifiers for the one or more PRS incorporates identifiers of the one or more transmission antennas as one or more sources of the one or more PRS.

Clause 32. The TRP of clause 31, wherein the TRP capability message indicates the capability of the TRP to transmit the one or more PRS by a plurality of transmission antennas, each transmission antenna configured with a different positioning frequency layer.

Clause 33. The TRP of clause 31, wherein the TRP capability message indicates the capability of the TRP to transmit the one or more PRS by a plurality of transmission antennas, each transmission antenna configured with a different frequency offset within a positioning frequency layer.

Clause 34. A signal transfer method, comprising: transmitting, from a transmission/reception point (TRP), a TRP capability message indicating a capability of the TRP to transmit one or more positioning reference signals (PRS) from one or more transmission antennas of the TRP; receiving, at the TRP, a PRS resource configuration message comprising information for transmitting PRS using the one or more transmission antennas based on the TRP capability message; and transmitting, using the one or more transmission antennas of the TRP, the one or more PRS based on the PRS resource configuration message, wherein an identifier for the one or more PRS incorporates identifiers of the one or more transmission antennas as one or more sources of the one or more PRS.

Clause 35. The method of clause 34, wherein the TRP capability message indicates the capability of the TRP to transmit the one or more PRS by a plurality of transmission antennas, each transmission antenna configured with a different positioning frequency layer.

Clause 36. The method of clause 34, wherein the TRP capability message indicates the capability of the TRP to transmit the one or more PRS by a plurality of transmission antennas, each transmission antenna configured with a different frequency offset within a positioning frequency layer.

Clause 37. A transmission/reception point (TRP), comprising: means for transmitting a TRP capability message indicating a capability of the TRP to transmit one or more positioning reference signals (PRS) from one or more transmission antennas of the TRP; means for receiving a PRS resource configuration message comprising information for transmitting PRS using the one or more transmission antennas based on the TRP capability message; and means for transmitting the one or more PRS using the one or more transmission antennas of the TRP based on the PRS resource configuration message, wherein one or more identifiers for the one or more PRS incorporates identifiers of the one or more transmission antennas as one or more sources of the one or more PRS.

Clause 38. The TRP of clause 37, wherein the TRP capability message indicates the capability of the TRP to transmit the one or more PRS by a plurality of transmission antennas, each transmission antenna configured with a different positioning frequency layer.

Clause 39. The TRP of clause 37, wherein the TRP capability message indicates the capability of the TRP to transmit the one or more PRS by a plurality of transmission antennas, each transmission antenna configured with a different frequency offset within a positioning frequency layer.

Clause 40. A non-transitory, processor-readable storage medium comprising processor-readable instructions to cause one or more processors of a transmission/reception point (TRP) to: transmit a TRP capability message indicating a capability of the TRP to transmit one or more positioning reference signals (PRS) from one or more transmission antennas of the TRP; receive a PRS resource configuration message comprising information for transmitting PRS using the one or more transmission antennas based on the TRP capability message; transmit, using the one or more transmission antennas, the one or more PRS based on the PRS resource configuration message, wherein one or more identifiers for the one or more PRS incorporates identifiers of the one or more transmission antennas as one or more sources of the one or more PRS.

Clause 41. The medium of clause 40, wherein the TRP capability message indicates the capability of the TRP to transmit the one or more PRS by a plurality of transmission antennas, each transmission antenna configured with a different positioning frequency layer.

Clause 42. The medium of clause 40, wherein the TRP capability message indicates the capability of the TRP to transmit the one or more PRS by a plurality of transmission antennas, each transmission antenna configured with a different frequency offset within a positioning frequency layer.

Clause 43. A network entity, comprising: one or more memories; one or more transceivers; and one or more processors, communicatively coupled to the one or more memories and the one or more transceivers, configured to: receive, from a user equipment (UE), a UE capability message indicating a capability of the UE to process one or more positioning reference signals (PRS) transmitted from one or more transmission antennas and received at one or more reception antennas of the UE; receive, from a transmission/reception point (TRP), a TRP capability message indicating a capability of the TRP to transmit the one or more PRS from the one or more transmission antennas; determine a PRS resource configuration based on the UE capability message and the TRP capability message; send, via the one or more transceivers to the TRP, a PRS resource configuration message comprising information for transmitting PRS using the one or more transmission antennas based on the TRP capability message; and send, via the one or more transceivers to the UE, assistance data comprising information for processing the PRS transmitted using the one or more transmission antennas based on the UE capability message.

Clause 44. The network entity of clause 43, wherein the UE capability message indicates the capability of the UE to receive the one or more PRS transmitted by a plurality of transmission antennas, each transmission antenna configured with a different positioning frequency layer.

Clause 45. The network entity of clause 43, wherein the UE capability message indicates the capability of the UE to receive the one or more PRS transmitted by a plurality of transmission antennas, each transmission antenna configured with a different frequency offset within a positioning frequency layer.

Clause 46. The network entity of clause 43, wherein the UE capability message indicates the capability of the UE to receive the one or more PRS with antenna switching among a plurality of reception antennas.

Clause 47. The network entity of clause 43, wherein the UE capability message indicates the capability of the UE to receive the one or more PRS without antenna switching among a plurality of reception antennas.

Clause 48. The network entity of clause 43, wherein the TRP capability message indicates the capability of the TRP to transmit the one or more PRS by a plurality of transmission antennas, each transmission antenna configured with a different positioning frequency layer.

Clause 49. The network entity of clause 43, wherein the TRP capability message indicates the capability of the TRP to transmit the one or more PRS by a plurality of transmission antennas, each transmission antenna configured with a different frequency offset within a positioning frequency layer.

Clause 50. A signal transfer method, comprising: receiving, from a user equipment (UE), a UE capability message indicating a capability of the UE to process one or more positioning reference signals (PRS) transmitted from one or more transmission antennas and received at one or more reception antennas of the UE; receiving, from a transmission/reception point (TRP), a TRP capability message indicating a capability of the TRP to transmit the one or more PRS from the one or more transmission antennas; determining a PRS resource configuration based on the UE capability message and the TRP capability message; sending, to the TRP, a PRS resource configuration message comprising information for transmitting PRS using the one or more transmission antennas based on the TRP capability message; and sending, to the UE, assistance data comprising information for processing the PRS transmitted using the one or more transmission antennas based on the UE capability message.

Clause 51. The method of clause 50, wherein the UE capability message indicates the capability of the UE to receive the one or more PRS transmitted by a plurality of transmission antennas, each transmission antenna configured with a different positioning frequency layer.

Clause 52. The method of clause 50, wherein the UE capability message indicates the capability of the UE to receive the one or more PRS transmitted by a plurality of transmission antennas, each transmission antenna configured with a different frequency offset within a positioning frequency layer.

Clause 53. The method of clause 50, wherein the UE capability message indicates the capability of the UE to receive the one or more PRS with antenna switching among a plurality of reception antennas.

Clause 54. The method of clause 50, wherein the UE capability message indicates the capability of the UE to receive the one or more PRS without antenna switching among a plurality of reception antennas.

Clause 55. The method of clause 50, wherein the TRP capability message indicates the capability of the TRP to transmit the one or more PRS by a plurality of transmission antennas, each transmission antenna configured with a different positioning frequency layer.

Clause 56. The method of clause 50, wherein the TRP capability message indicates the capability of the TRP to transmit the one or more PRS by a plurality of transmission antennas, each transmission antenna configured with a different frequency offset within a positioning frequency layer.

Clause 57. A network entity, comprising: means for receiving, from a user equipment (UE), a UE capability message indicating a capability of the UE to process one or more positioning reference signals (PRS) transmitted from one or more transmission antennas and received at one or more reception antennas of the UE; means for receiving, from a transmission/reception point (TRP), a TRP capability message indicating a capability of the TRP to transmit the one or more PRS from the one or more transmission antennas; means for determining a PRS resource configuration based on the UE capability message and the TRP capability message; means for sending, to the TRP, a PRS resource configuration message comprising information for transmitting PRS using the one or more transmission antennas based on the TRP capability message; and means for sending, to the UE, assistance data comprising information for processing the PRS transmitted using the one or more transmission antennas based on the UE capability message.

Clause 58. The network entity of clause 57, wherein the UE capability message indicates the capability of the UE to receive the one or more PRS transmitted by a plurality of transmission antennas, each transmission antenna configured with a different positioning frequency layer.

Clause 59. The network entity of clause 57, wherein the UE capability message indicates the capability of the UE to receive the one or more PRS transmitted by a plurality of transmission antennas, each transmission antenna configured with a different frequency offset within a positioning frequency layer.

Clause 60. The network entity of clause 57, wherein the UE capability message indicates the capability of the UE to receive the one or more PRS with antenna switching among a plurality of reception antennas.

Clause 61. The network entity of clause 57, wherein the UE capability message indicates the capability of the UE to receive the one or more PRS without antenna switching among a plurality of reception antennas.

Clause 62. The network entity of clause 57, wherein the TRP capability message indicates the capability of the TRP to transmit the one or more PRS by a plurality of transmission antennas, each transmission antenna configured with a different positioning frequency layer.

Clause 63. The network entity of clause 57, wherein the TRP capability message indicates the capability of the TRP to transmit the one or more PRS by a plurality of transmission antennas, each transmission antenna configured with a different frequency offset within a positioning frequency layer.

Clause 64. A non-transitory, processor-readable storage medium comprising processor-readable instructions to cause one or more processors of a location server to: receive, from a user equipment (UE), a UE capability message indicating a capability of the UE to process one or more positioning reference signals (PRS) transmitted from one or more transmission antennas and received at one or more reception antennas of the UE; receive, from a transmission/reception point (TRP), a TRP capability message indicating a capability of the TRP to transmit the one or more PRS from the one or more transmission antennas; determine a PRS resource configuration based on the UE capability message and the TRP capability message; send, to the TRP, a PRS resource configuration message comprising information for transmitting PRS using the one or more transmission antennas based on the TRP capability message; and send, to the UE, assistance data comprising information for processing the PRS transmitted using the one or more transmission antennas based on the UE capability message.

Clause 65. The medium of clause 64, wherein the UE capability message indicates the capability of the UE to receive the one or more PRS transmitted by a plurality of transmission antennas, each transmission antenna configured with a different positioning frequency layer.

Clause 66. The medium of clause 64, wherein the UE capability message indicates the capability of the UE to receive the one or more PRS transmitted by a plurality of transmission antennas, each transmission antenna configured with a different frequency offset within a positioning frequency layer.

Clause 67. The medium of clause 64, wherein the UE capability message indicates the capability of the UE to receive the one or more PRS with antenna switching among a plurality of reception antennas.

Clause 68. The medium of clause 64, wherein the UE capability message indicates the capability of the UE to receive the one or more PRS without antenna switching among a plurality of reception antennas.

Clause 69. The medium of clause 64, wherein the TRP capability message indicates the capability of the TRP to transmit the one or more PRS by a plurality of transmission antennas, each transmission antenna configured with a different positioning frequency layer.

Clause 70. The medium of clause 64, wherein the TRP capability message indicates the capability of the TRP to transmit the one or more PRS by a plurality of transmission antennas, each transmission antenna configured with a different frequency offset within a positioning frequency layer.

Other Considerations

Other examples and implementations are within the scope of the disclosure and appended claims. For example, due to the nature of software and computers, functions described above can be implemented using software executed by one or more processors, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "one or more processors" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., one or more processors, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "one or more processors configured to measure at least one of A or B" or "one or more processors configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., one or more processors, is configured to at least one of perform function X or perform function Y means that the item may be configured to perform the function X, or may be configured to perform the function Y, or may be configured to perform the function X and to perform the function Y. For example, a phrase of "one or more processors configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by one or more processors, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, one or more processors-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE), comprising:

one or more memories;

one or more reception antennas;

one or more transceivers; and one or more processors, communicatively coupled to the one or more memories and the one or more transceivers, configured to:

transmit, via the one or more transceivers, a UE capability message indicating a capability of the UE to process one or more positioning reference signals (PRS) transmitted from one or more transmission antennas and received at the one or more reception antennas, wherein the UE capability message indicates the capability of the UE to receive the one or more PRS without antenna switching among a plurality of reception antennas;

receive, via the one or more transceivers, assistance data comprising information for processing the one or more PRS transmitted from the one or more transmission antennas based on the UE capability message;

receive, via the one or more reception antennas, the one or more PRS from the one or more transmission antennas; and obtain one or more measurements based on the one or more PRS and associate each of the one or more measurements with one of the one or more transmission antennas as a PRS source antenna and one of the one or more reception antennas as a PRS reception antenna.

2. The UE of claim 1, wherein the PRS source antenna comprises the one of the one or more transmission antennas that transmitted the one or more PRS from which the one or more associated measurements is obtained.

3. The UE of claim 1, wherein the PRS reception antenna comprises the one or more of the reception antennas that received the one or more PRS from which the one or more associated measurements is obtained.

4. The UE of claim 1, wherein the UE capability message indicates the capability of the UE to receive the one or more PRS transmitted by a plurality of transmission antennas, each transmission antenna configured with a different positioning frequency layer.

5. The UE of claim 1, wherein the UE capability message indicates the capability of the UE to receive the one or more PRS transmitted by a plurality of transmission antennas, each transmission antenna configured with a different frequency offset within a positioning frequency layer.

6. The UE of claim 1, wherein the UE capability message includes an on-demand request for PRS transmissions.

7. A method for positioning, comprising:

transmitting, from a user equipment (UE), a UE capability message indicating a capability of the UE to process one or more positioning reference signals (PRS) transmitted from one or more transmission antennas and received at one or more reception antennas of the UE, wherein the UE capability message indicates the capability of the UE to receive the one or more PRS without antenna switching among a plurality of reception antennas;

receiving, at the UE, assistance data comprising information for processing the one or more PRS transmitted from the one or more transmission antennas based on the UE capability message;

receiving, at the one or more reception antennas of the UE, the one or more PRS from the one or more transmission antennas; and obtaining one or more measurements based on the one or more PRS and associating each of the one or more measurements with one of the one or more transmission antennas as a PRS source antenna and one of the one or more reception antennas as a PRS reception antenna.

8. The method of claim 7, wherein the PRS source antenna comprises the one of the one or more transmission antennas that transmitted the one or more PRS from which the one or more associated measurements is obtained.

9. The method of claim 7, wherein the PRS reception antenna comprises the one or more of the reception antennas that received the one or more PRS from which the one or more associated measurements is obtained.

10. The method of claim 7, wherein the UE capability message indicates the capability of the UE to receive the one or more PRS transmitted by a plurality of transmission antennas, each transmission antenna configured with a different positioning frequency layer.

11. The method of claim 7, wherein the UE capability message indicates the capability of the UE to receive the one or more PRS transmitted by a plurality of transmission antennas, each transmission antenna configured with a different frequency offset within a positioning frequency layer.

12. The method of claim 7, wherein the UE capability message includes an on-demand request for PRS transmissions.

13. A transmission/reception point (TRP), comprising:

one or more memories;

one or more transmission antennas;

one or more transceivers; and one or more processors, communicatively coupled to the one or more memories and the one or more transceivers, configured to:

transmit, via the one or more transceivers, a TRP capability message indicating a capability of the TRP to transmit one or more positioning reference signals (PRS) from the one or more transmission antennas;

receive, via the one or more transceivers, a PRS resource configuration message comprising information for transmitting PRS using the one or more transmission antennas based on the TRP capability message;

transmit, using the one or more transmission antennas, the one or more PRS based on the PRS resource configuration message, wherein one or more identifiers for the one or more PRS incorporates identifiers of the one or more transmission antennas as one or more sources of the one or more PRS.

14. The TRP of claim 13, wherein the TRP capability message indicates the capability of the TRP to transmit the one or more PRS by a plurality of transmission antennas, each transmission antenna configured with a different positioning frequency layer.

15. The TRP of claim 13, wherein the TRP capability message indicates the capability of the TRP to transmit the one or more PRS by a plurality of transmission antennas, each transmission antenna configured with a different frequency offset within a positioning frequency layer.

16. A method for positioning, comprising:

transmitting, from a transmission/reception point (TRP), a TRP capability message indicating a capability of the TRP to transmit one or more positioning reference signals (PRS) from one or more transmission antennas of the TRP;

receiving, at the TRP, a PRS resource configuration message comprising information for transmitting PRS using the one or more transmission antennas based on the TRP capability message; and transmitting, using the one or more transmission antennas of the TRP, the one or more PRS based on the PRS resource configuration message, wherein an identifier for the one or more PRS incorporates identifiers of the one or more transmission antennas as one or more sources of the one or more PRS.

17. The method of claim 16, wherein the TRP capability message indicates the capability of the TRP to transmit the one or more PRS by a plurality of transmission antennas, each transmission antenna configured with a different positioning frequency layer.

18. The method of claim 16, wherein the TRP capability message indicates the capability of the TRP to transmit the one or more PRS by a plurality of transmission antennas, each transmission antenna configured with a different frequency offset within a positioning frequency layer.

19. A network entity, comprising:

one or more memories;

one or more transceivers; and one or more processors, communicatively coupled to the one or more memories and the one or more transceivers, configured to:

receive, from a user equipment (UE), a UE capability message indicating a capability of the UE to process one or more positioning reference signals (PRS) transmitted from one or more transmission antennas and received at one or more reception antennas of the UE;

receive, from a transmission/reception point (TRP), a TRP capability message indicating a capability of the TRP to transmit the one or more PRS from the one or more transmission antennas;

determine a PRS resource configuration based on the UE capability message and the TRP capability message;

send, via the one or more transceivers to the TRP, a PRS resource configuration message comprising information for transmitting PRS using the one or more transmission antennas based on the TRP capability message; and send, via the one or more transceivers to the UE, assistance data comprising information for processing the PRS transmitted from the one or more transmission antennas based on the UE capability message.

20. The network entity of claim 19, wherein the UE capability message indicates the capability of the UE to receive the one or more PRS transmitted by a plurality of transmission antennas, each transmission antenna configured with a different positioning frequency layer.

21. The network entity of claim 19, wherein the UE capability message indicates the capability of the UE to receive the one or more PRS transmitted by a plurality of transmission antennas, each transmission antenna configured with a different frequency offset within a positioning frequency layer.

22. The network entity of claim 19, wherein the UE capability message indicates the capability of the UE to receive the one or more PRS with antenna switching among a plurality of reception antennas.

23. The network entity of claim 19, wherein the UE capability message indicates the capability of the UE to receive the one or more PRS without antenna switching among a plurality of reception antennas.

24. The network entity of claim 19, wherein the TRP capability message indicates the capability of the TRP to transmit the one or more PRS by a plurality of transmission antennas, each transmission antenna configured with a different positioning frequency layer.

25. The network entity of claim 19, wherein the TRP capability message indicates the capability of the TRP to transmit the one or more PRS by a plurality of transmission antennas, each transmission antenna configured with a different frequency offset within a positioning frequency layer.

26. A method for positioning, comprising:

receiving, from a user equipment (UE), a UE capability message indicating a capability of the UE to process one or more positioning reference signals (PRS) transmitted from one or more transmission antennas and received at one or more reception antennas of the UE;

receiving, from a transmission/reception point (TRP), a TRP capability message indicating a capability of the TRP to transmit the one or more PRS from the one or more transmission antennas;

determining a PRS resource configuration based on the UE capability message and the TRP capability message;

sending, to the TRP, a PRS resource configuration message comprising information for transmitting PRS using the one or more transmission antennas based on the TRP capability message; and sending, to the UE, assistance data comprising information for processing the PRS transmitted from the one or more transmission antennas based on the UE capability message.

27. The method of claim 26, wherein the UE capability message indicates the capability of the UE to receive the one or more PRS transmitted by a plurality of transmission antennas, each transmission antenna configured with a different positioning frequency layer.

28. The method of claim 26, wherein the UE capability message indicates the capability of the UE to receive the one or more PRS transmitted by a plurality of transmission antennas, each transmission antenna configured with a different frequency offset within a positioning frequency layer.

29. The method of claim 26, wherein the UE capability message indicates the capability of the UE to receive the one or more PRS with antenna switching among a plurality of reception antennas.

30. The method of claim 26, wherein the UE capability message indicates the capability of the UE to receive the one or more PRS without antenna switching among a plurality of reception antennas.

31. The method of claim 26, wherein the TRP capability message indicates the capability of the TRP to transmit the one or more PRS by a plurality of transmission antennas, each transmission antenna configured with a different positioning frequency layer.

32. The method of claim 26, wherein the TRP capability message indicates the capability of the TRP to transmit the one or more PRS by a plurality of transmission antennas, each transmission antenna configured with a different frequency offset within a positioning frequency layer.

* * * * *